US012515218B2

(12) United States Patent
Nagaoka et al.

(10) Patent No.: US 12,515,218 B2
(45) Date of Patent: Jan. 6, 2026

(54) SAMPLE PROCESSING DEVICE AND APPARATUS

(71) Applicant: Hitachi High-Tech Corporation, Tokyo (JP)

(72) Inventors: Yoshihiro Nagaoka, Tokyo (JP); Wataru Sato, Tokyo (JP); Shuhei Yamamoto, Tokyo (JP); Taro Nakazawa, Tokyo (JP); Michiru Fujioka, Tokyo (JP); Ayaka Okuno, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 1270 days.

(21) Appl. No.: 17/269,801

(22) PCT Filed: Sep. 27, 2018

(86) PCT No.: PCT/JP2018/035825

§ 371 (c)(1),
(2) Date: Feb. 19, 2021

(87) PCT Pub. No.: WO2020/065803

PCT Pub. Date: Apr. 2, 2020

(65) Prior Publication Data

US 2021/0316304 A1 Oct. 14, 2021

(51) Int. Cl.

*B01L 3/00* (2006.01)
*B01F 31/65* (2022.01)
*B01F 33/00* (2022.01)

(52) U.S. Cl.

CPC ..... *B01L 3/502715* (2013.01); *B01L 3/50273* (2013.01); *B01L 3/565* (2013.01);

(Continued)

(58) Field of Classification Search

None

See application file for complete search history.

(56) References Cited

U.S. PATENT DOCUMENTS

| | | | | |
|---|---|---|---|---|
| 2006/0073484 A1* | 4/2006 | Mathies | C12Q 1/6806 | 435/6.19 |
| 2007/0183935 A1* | 8/2007 | Clemmens | B01L 3/50273 | 435/286.7 |

(Continued)

FOREIGN PATENT DOCUMENTS

| | | |
|---|---|---|
| JP | 2007-162899 A | 6/2007 |
| JP | 2013-519884 A | 5/2013 |

(Continued)

OTHER PUBLICATIONS

United Kingdom Examination Report dated Mar. 8, 2022 for United Kingdom Patent Application No. 2101838.7.

(Continued)

*Primary Examiner* — Neil N Turk

(74) *Attorney, Agent, or Firm* — Volpe Koenig

(57) ABSTRACT

To introduce a reagent with a small amount of residual liquid and enable a fluidic manipulation by deformation of an elastic film, a sealed type of sample processing device is configured with a reagent storage including a joint portion which joins an upper film and a lower film at a periphery of a storage space which stores a reagent between both films, an analysis chip including a lower surface fluid channel through which a liquid flows on a lower surface side and an upper surface fluid channel through which the liquid flows on an upper surface side, and an elastic film which seals the lower surface side of the analysis chip. A portion of the lower film is joined to the upper surface side of the analysis chip, a removed portion, in which the lower film is partially removed, is in an upper part of the upper surface fluid channel.

5 Claims, 24 Drawing Sheets

(52) U.S. Cl.
CPC ..... *B01L 2200/028* (2013.01); *B01L 2200/16* (2013.01); *B01L 2300/123* (2013.01); *B01L 2400/0481* (2013.01)

(56) References Cited

U.S. PATENT DOCUMENTS

| | | | |
|---|---|---|---|
| 2011/0212453 | A1 | 9/2011 | Agarwal et al. |
| 2011/0315227 | A1 | 12/2011 | Shu |
| 2015/0190802 | A1 | 7/2015 | Oppenheimer et al. |
| 2016/0305972 | A1 | 10/2016 | Ogg et al. |
| 2017/0138974 | A1 | 5/2017 | Nakazawa et al. |
| 2019/0314809 | A1 | 10/2019 | Nagaoka et al. |

FOREIGN PATENT DOCUMENTS

| | | | |
|---|---|---|---|
| JP | 2017-096819 | A | 6/2017 |
| WO | 2010/073020 | A1 | 7/2010 |
| WO | 2015/186454 | A1 | 4/2017 |
| WO | 2018/020924 | A1 | 2/2018 |

OTHER PUBLICATIONS

PCT/JP2018/035825 International Search Report, Nov. 20, 2018; 2pgs.

* cited by examiner (A)

(B)

(A)

(B)

SAMPLE PROCESSING DEVICE AND APPARATUS

TECHNICAL FIELD

The present invention relates to a sample processing device and an apparatus, and more particularly to a sample processing device and an apparatus for performing a fluidic manipulation of liquid by deformation of an elastic film.

BACKGROUND ART

A microfluidic system and a method are described in PTL 1. PTL 1 describes the microfluidic system including a removable microfluidic device and a control means. The removable microfluidic device includes a rigid layer, an elastic layer, and at least one fluidic chamber or a fluid channel between both layers. The control means includes a means for deforming the elastic layer by manipulating a fluid in the fluidic chamber or the fluid channel. PTL 2 describes a storage container, a fluidic cartridge, and a discharge mechanism, in which the liquid hardly remains when the stored liquid flows out.

CITATION LIST

Patent Literature

PTL 1: WO 2010/073020
PTL 2: JP 2017-096819 A

SUMMARY OF INVENTION

Technical Problem

The microfluidic device described in PTL 1 realizes the inflow of a fluid into the fluidic chamber to which the fluid channel is connected or the outflow of the fluid from the fluidic chamber by deformation of the elastic layer. However, there is no description about a sealing structure of the microfluidic device. For this reason, in a case where the inflow-side upstream or the outflow-side downstream of the fluid is in an open state, an intended fluidic manipulation is possible, but in a case where the device is used in a sealed state, there is a drawback that the fluidic manipulation is impossible. Further, in the configuration described in PTL 2, a pin for reagent is used, and this causes a drawback that it is not easy to control the outflow of a slight amount of liquid.

An object of the invention is to address the above-mentioned drawbacks and to provide a sample processing device and an apparatus for introducing a reagent with a small amount of residual liquid in a device in a sealed state and performing a fluidic manipulation by deformation of an elastic film.

Solution to Problem

In order to achieve the above object, according to the invention, provided is a sample processing device including: a reagent storage; a processing unit including an upper surface fluid channel through which a liquid flows on an upper surface side, and a lower surface fluid channel through which the liquid flows on a lower surface side, both ends of the upper surface fluid channel communicating with the lower surface fluid channels that are different; and an elastic film which seals the lower surface side of the processing unit, wherein the reagent storage includes a storage space which stores a reagent between an upper member and the upper surface side of the processing unit, and a joint portion which joins the upper member and the upper surface side of the processing unit at a periphery of the storage space and a periphery of the upper surface fluid channel, and the joint portion includes a low-strength joint portion in which at least a part between the upper surface fluid channel and the storage space is weaker in joint strength than other parts.

In addition, in order to achieve the above object, according to the invention, provided is a sample processing device including: a reagent storage; a processing unit including an upper surface fluid channel through which a liquid flows on an upper surface side, and a lower surface fluid channel through which the liquid flows on a lower surface side, both ends of the upper surface fluid channel communicating with the lower surface fluid channels that are different; and an elastic film which seals the lower surface side of the processing unit, wherein the reagent storage includes an upper member, a lower member, a storage space which stores a reagent between both members, and a joint portion which joins the both members at a periphery of the storage space, the lower member includes a removed portion, from which a part of the lower member has been removed, in an upper part of the upper surface fluid channel, and the joint portion includes a low-strength joint portion in which at least a part between the removed portion and the storage space is weaker in joint strength than other parts.

Furthermore, in order to achieve the above object, according to the invention, provided is a sample processing apparatus including: a reagent storage; a processing unit including an upper surface fluid channel through which a liquid flows on an upper surface side, and a lower surface fluid channel through which the liquid flows on a lower surface side, both ends of the upper surface fluid channel communicating with the lower surface fluid channels that are different; a driving unit which controls air; an elastic film arranged between the processing unit and the driving unit; and a pneumatic controller which switches between whether the elastic film is adhered to the processing unit or the driving unit, wherein the reagent storage includes an upper member, a lower member, a storage space which stores a reagent between both members, and a joint portion which joins the both members at a periphery of the storage space, at least a part of the lower member is joined to the upper surface side of the processing unit, and the lower member includes a removed portion, from which a part of the lower member has been removed, in an upper part of the upper surface fluid channel, and the joint portion includes a low-strength joint portion in which at least a part between the removed portion and the storage space is weaker in joint strength than other parts.

Advantageous Effects of Invention

According to the invention, it is possible to provide a sample processing apparatus capable of performing a fluidic manipulation by deformation of an elastic film in a device in a sealed state, and introducing a reagent with a small amount of residual liquid. It is to be noted that the drawbacks, configurations, and effects other than those described above will be sequentially clarified by the description of the following embodiments.

DESCRIPTION OF EMBODIMENTS

Hereinafter, a configuration of a sample processing device and an apparatus in the present embodiment will be sequentially described with reference to the drawings. It is to be noted that, in principle, identical numerals are given to the identical objects in a plurality of drawings. In the present description, a "sealed device" means a combination of a processing unit, in which a liquid and the air to be processed in the inside are not in contact with the outside, and a reagent storage.

First Embodiment

Hereinafter, a fundamental configuration of a sample processing device and an apparatus according to a first embodiment will be described with reference to FIGS. 1 to 7.

The present embodiment is an embodiment of a sample processing apparatus configured by including a reagent storage; a processing unit including an upper surface fluid channel through which a liquid flows on an upper surface side, and a lower surface fluid channel through which the liquid flows on a lower surface side, both ends of the upper surface fluid channel communicating with the lower surface fluid channels that are different; a driving unit which controls air; an elastic film arranged between the processing unit and the driving unit; and a pneumatic controller which switches between whether the elastic film is adhered to the processing unit or the driving unit. The reagent storage includes an upper member, a lower member, a storage space which stores a reagent between both members, and a joint portion which joins the both members at a periphery of the storage space, at least a part of the lower member is joined to the upper surface side of the processing unit. The lower member includes a removed portion, from which a part of the lower member has been removed, in an upper part of the upper surface fluid channel. In the joint portion, at least a part between the removed portion and the storage space is weaker in joint strength than other parts.

In the present embodiment, a description will be given, as an example, of a sample processing apparatus, in which a sample such as liquefied blood, urine, swab, or the like and a reagent are fluidized and mixed at a certain volume ratio in a sample processing device, and optical measurements such as identification and quantification of chemical substances are performed.

Figure 1:
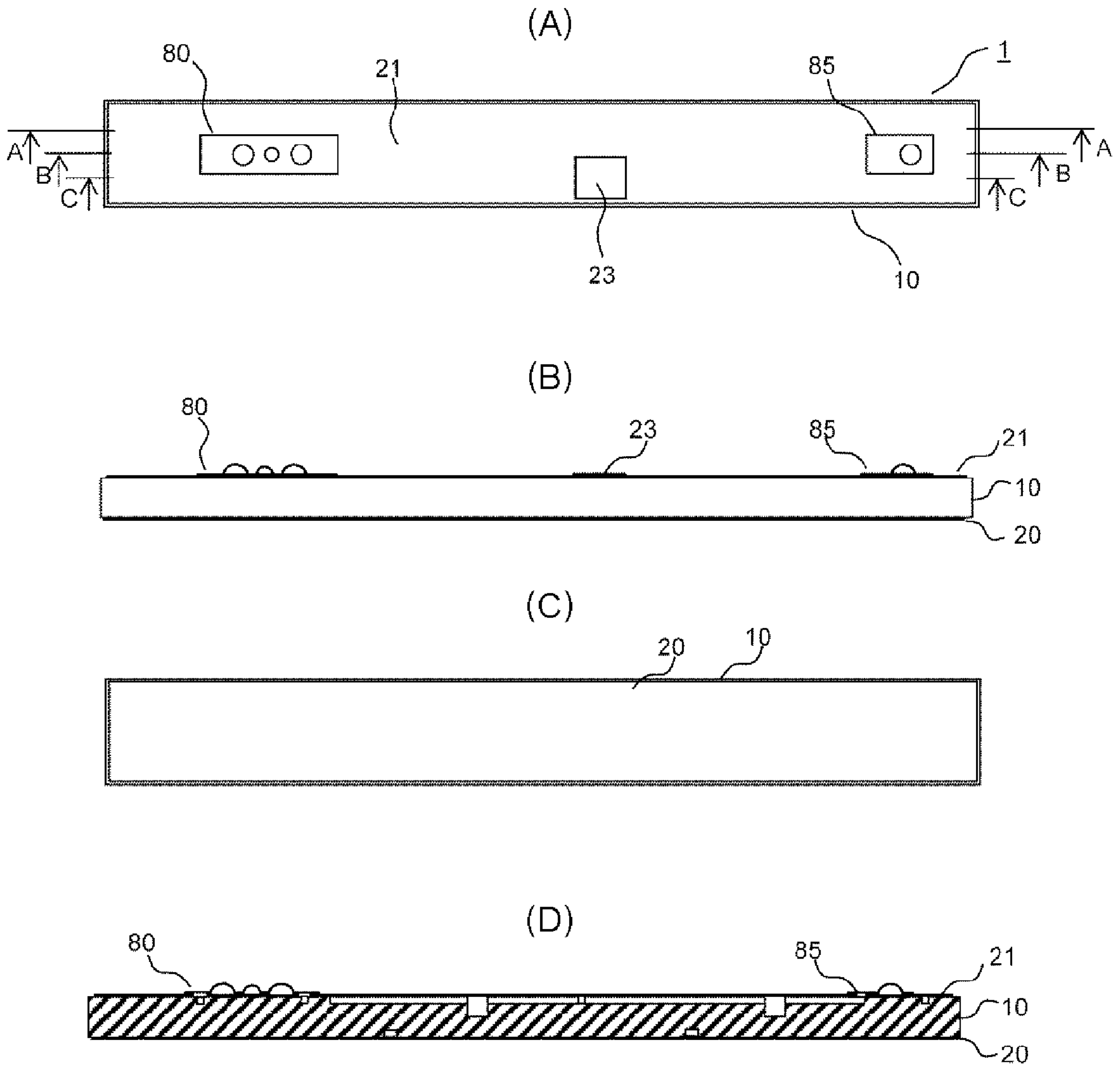
FIG. 1 is a diagram showing an example of a sample processing device according to a first embodiment.

(A), (B), (C), and (D) of FIG. 1 show a top view, a side view, a bottom view, and a side cross-sectional view (BB cross section) of a sample processing device 1 according to the first embodiment.

An analysis chip 10, which is a processing unit of the sample processing device 1, has an upper surface, which is joined by a sealing film 21, and reagent storages 80 and 85 are joined to the sealing film 21. A lower surface of the analysis chip 10 is sealed with a membrane 20, which is an elastic film. As described above, in the present description, a combination of the analysis chip and the reagent storage is referred to as a sealed device. The analysis chip serves as a processing unit, to which such an elastic film, the sealing film, and the like are adhered and in which no fluid flows in from or flows out to the outside.

Figure 2:
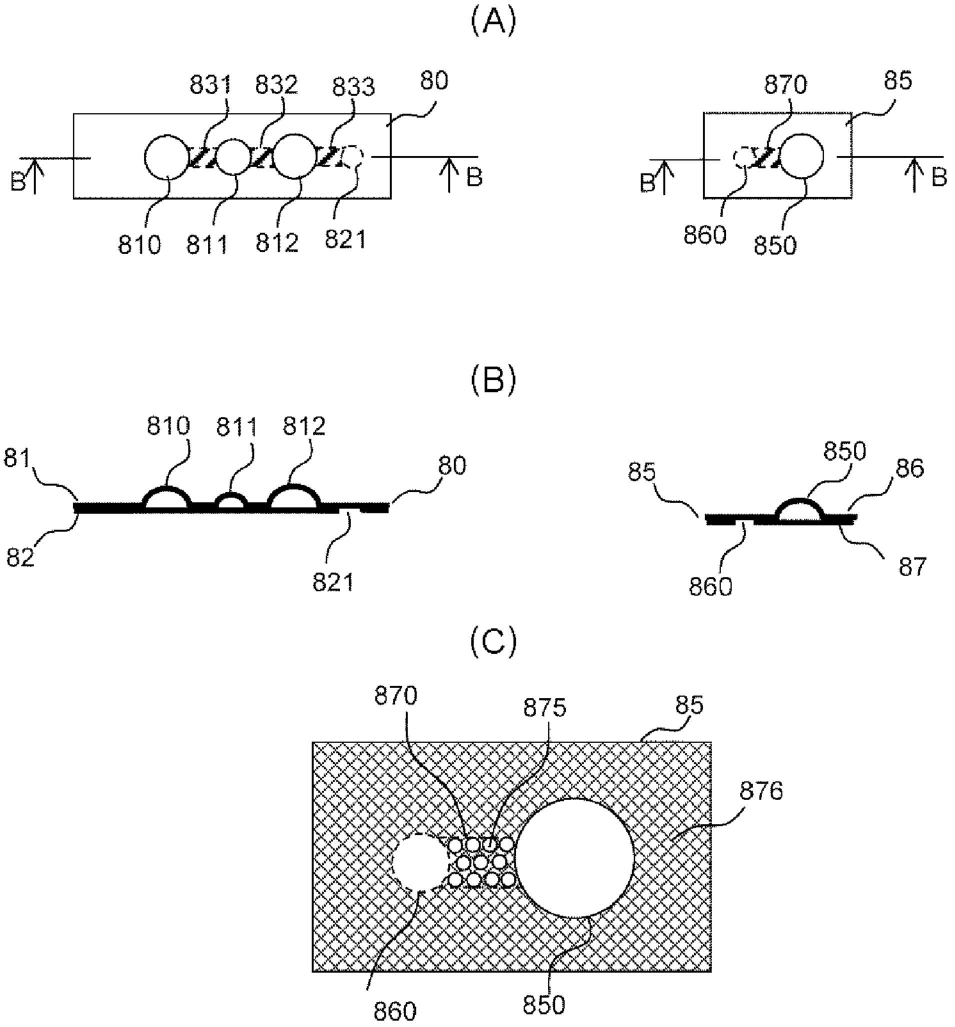
FIG. 2 is a diagram showing an example of a reagent storage according to the first embodiment.

(A) and (B) of FIG. 2 are a top view and a side cross-sectional view (BB cross section) of the reagent storages 80 and 85 according to the first embodiment.

The multi-liquid reagent storage 80 includes a multi-liquid upper film 81 and a multi-liquid lower film 82. Different reagents can be respectively held in a first reagent chamber 810, a second reagent chamber 811, and a third reagent chamber 812, each of which is a convex portion on the multi-liquid upper film 80. The multi-liquid lower film 82 includes a third reagent film removed portion 821, from which a film is removed and is missing. In a state where the respective reagents are held, contact surfaces of the multi-liquid upper film 81 and the multi-liquid lower film 82 are joined to form a joint portion except for a part of the third reagent film removed portion 821. That is, the joint portion means a part where both films are joined to each other at a periphery of a storage space.

A first-second reagent low-strength joint portion 831, a second-third reagent low-strength joint portion 832, and a third reagent low-strength joint portion 833, which are hatched, are weaker in joint strength than other joint portions. Although no reagent flows out during transportation or storage, only the low-strength joint portions 831, 832, and 833 are peeled off by a manipulation such as crushing the convex portions of the multi-liquid upper film 80 from above, and communication between the reagent chambers or between the reagent chamber and the film removed portion is established, so that the reagents can be discharged.

A single-liquid reagent storage 85 has a similar structure and is composed of a single-liquid upper film 86 and a single-liquid lower film 87. A reagent can be held in a fourth reagent chamber 850, which is a convex portion of the single-liquid upper film 86. The single-liquid lower film 87 includes a fourth reagent film removed portion 860. In a state where the reagent is held, contact surfaces of the single-liquid upper film 86 and the single-liquid lower film 87 are joined to form a joint portion except for a part of the fourth reagent film removed portion 860. Only a fourth reagent low-strength joint portion 870, which is hatched, is weaker in joint strength than the other joint portions. Although no reagent flows out during transportation or storage, only the low-strength joint portion 870 is peeled off by a manipulation such as crushing the convex portion of the single-liquid upper film 85 from above, and communication between the reagent chamber and the film removed portion is established, so that the reagent can be discharged.

Examples of a method for joining the above-described joint portions include heat crimping and use of a solvent or an adhesive.

In a case of the heat crimping, optimum temperature, pressure, and joint processing time can be considered depending on the combination of materials, and are selected from conditions of a low temperature, a low pressure, and a short period of time for the low-strength joint portions. Alternatively, as shown in (C) of FIG. 2, a joint region may be limited. (C) of FIG. 2 shows a joint state of the single-liquid reagent storage 85, and a part 876 other than the fourth reagent chamber 850, the fourth reagent film removed portion 860, and the fourth reagent low-strength joint portion 870 is a normal joint portion. Only a region of the fourth reagent low-strength joint portion 870 is partially provided with a non-joint region 875.

In a case where a solvent or an adhesive is used, a solvent or an adhesive with weak adhesiveness may be used for the low-strength joint portion, or an adhesive region may be narrowed. Alternatively, as shown in (C) of FIG. 2, the non-joint region 875 where a solvent or an adhesive is not partially used may be provided.

Alternatively, a double-sided tape may be used between the upper and lower members. In this case, the joint strength may be weakened only in a region of the low-strength joint portion, or as shown in (C) of FIG. 2, the non-joint region 875 where no adhesive is partially used may be provided.

Figure 3:
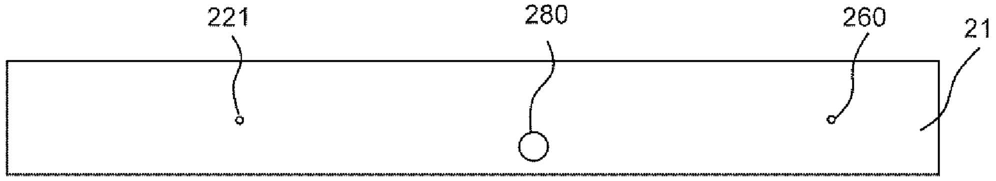
FIG. 3 is a top view of a sealing film according to the first embodiment.

FIG. 3 is a top view of the sealing film 21 of the analysis chip 10 as the processing unit according to the first embodiment. The sealing film 21 includes three through holes. That is, a third reagent through hole 221 is located at a position corresponding to the third reagent film removed portion 821 of the multi-liquid reagent storage 80. A fourth reagent through hole 260 is located at a position corresponding to the fourth reagent film removed portion 860 of the single-liquid reagent storage 85. A feeder hole 280 is provided at a position corresponding to a feeder film 23.

Figure 4:
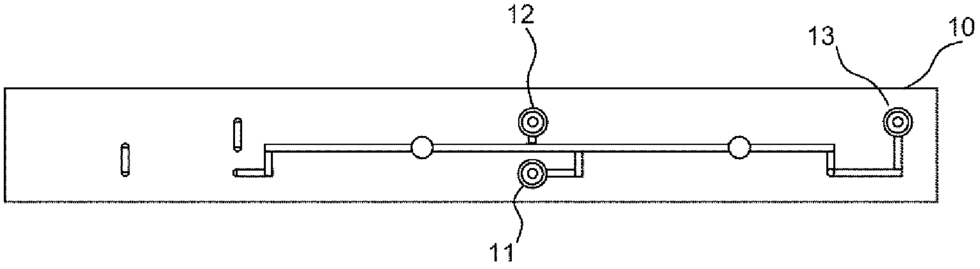
FIG. 4 is a diagram showing an upper surface and a lower surface of an analysis chip according to the first embodiment.
Figure 4:
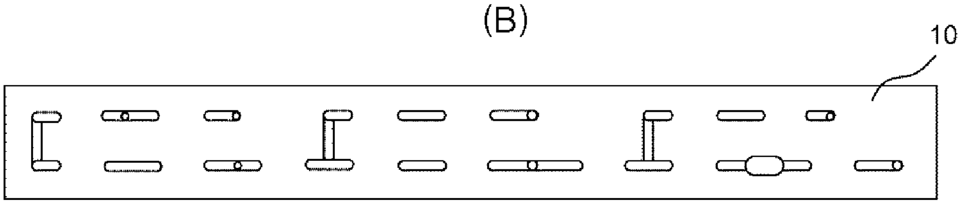

(A) and (B) of FIG. 4 are a top view and a bottom view of the analysis chip 10. Wells 11, 12, and 13 and an upper surface groove to be described later are provided on the upper surface side of the analysis chip 10, and a lower surface groove to be described later is provided on the lower surface side.

Figure 5:
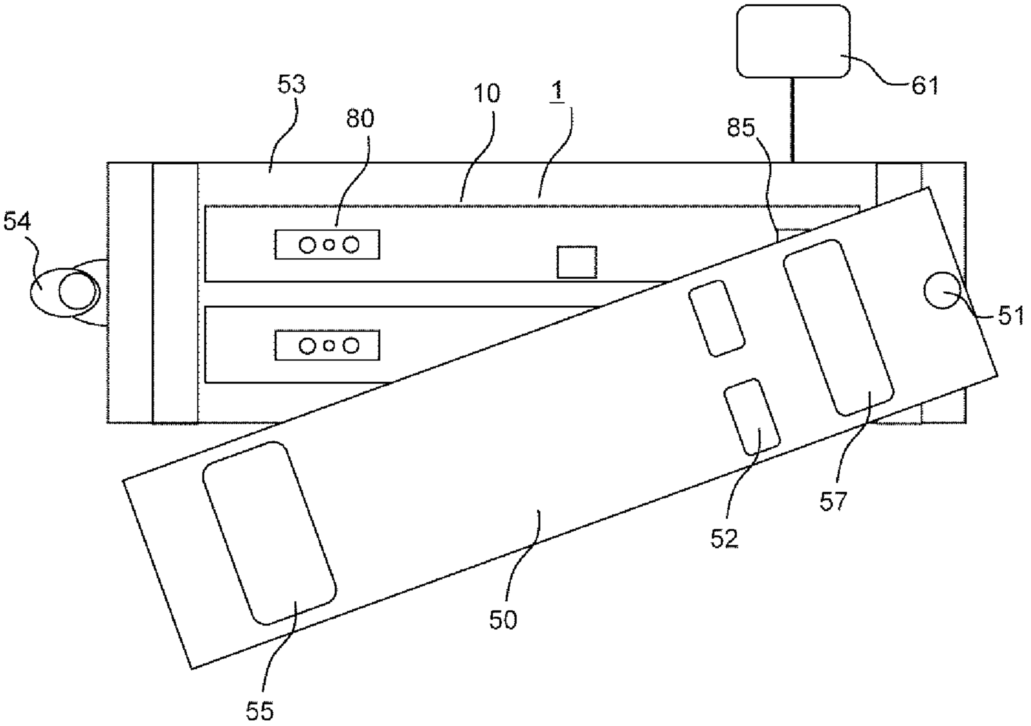
FIG. 5 is a diagram showing an upper surface and a side surface of a sample processing apparatus according to the first embodiment.
Figure 5:
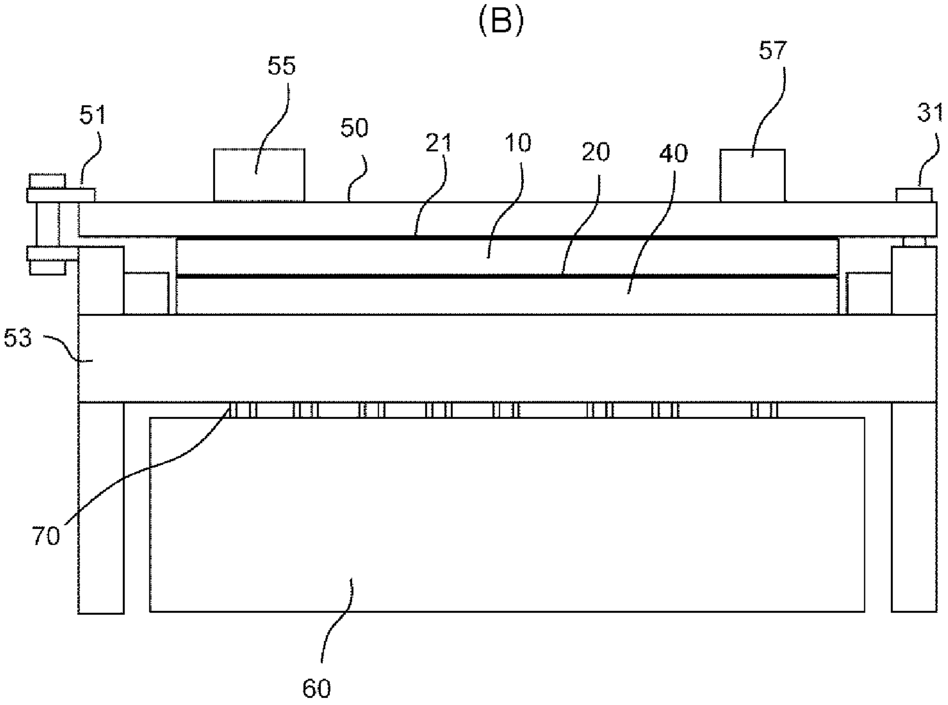

(A) and (B) of FIG. 5 show a top view and a side view of the sample processing apparatus according to the first embodiment. In the sample processing apparatus shown in the figure, the sealing film 21, the analysis chip 10, and the membrane 20 are pressed against a driving unit 40 by a lid 50, and the reagent storages 80 and 85 are mounted on the sealing film 21 to constitute a sealed device.

The lid 50 is rotatably supported around a rotation support 51, and in (A) of FIG. 5, the lid 50 is in a half-opened state and two analysis chips 10 are arranged side by side. In (B) of FIG. 5, the lid 50 is completely closed and is tightened to a housing 53 by a lock mechanism 54. The lid 50 is provided with observation windows 52 for observing analysis results. Further, the lid 50 is provided with extruding mechanisms 55 and 57, which are respectively used for discharging the reagents from the reagent storages 80 and 85.

A pneumatic controller 60 for controlling the air pressure in the driving unit 40 is provided under the housing 53, and air piping 70 is connected from the driving unit 40 to the pneumatic controller 60. The operation of the pneumatic controller 60 is controlled by a signal from a manipulation unit 61 such as a control computer outside the sample processing apparatus.

Figure 6:
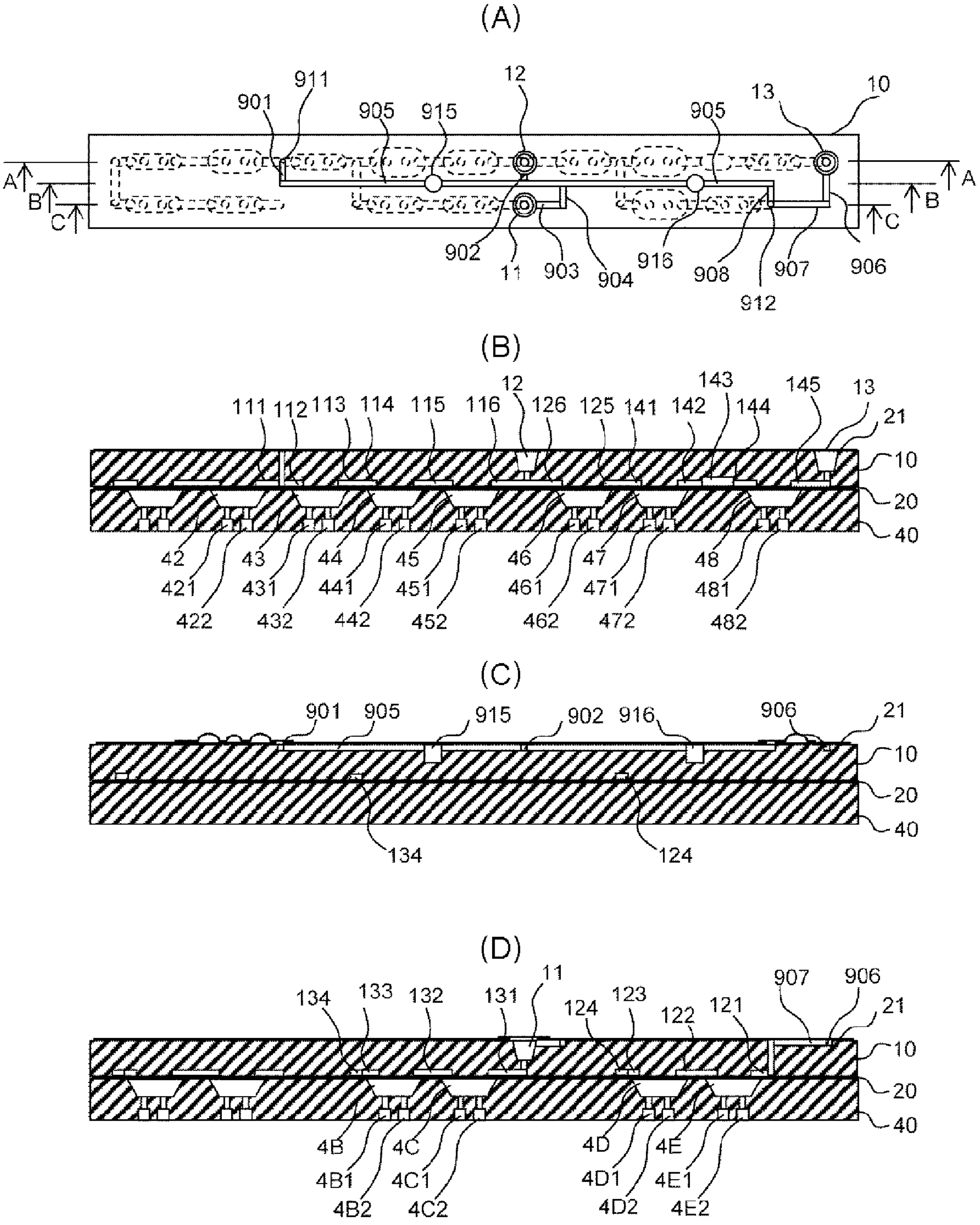
FIG. 6 is a diagram showing an upper surface and a side cross section of the sample processing device and a driving unit according to the first embodiment.

(A), (B), (C), and (D) of FIG. 6 are a top view, a side view, a side cross-sectional view (AA cross section), a side cross-sectional view (BB cross section), and a side cross-sectional view (CC cross section) of the sample processing device, according to the first embodiment, which is adhered to the driving unit 40 via the membrane 20. FIG. 6 shows a state in which the sample processing device is mounted on the sample processing apparatus of FIG. 5, and the driving unit 40 is pressed by the lid 50 via the membrane 20.

(A) of FIG. 6 is a view seen from the upper surface side of the sample processing device, and the wells as containers on the upper surface side of the analysis chip and a circulation groove 901 as an air circulation fluid channel are indicated by solid lines, and a groove 111 on the lower surface side of the analysis chip and recesses that constitute recesses of the driving unit 40 are indicated by broken lines. It is to be noted that for the sake of visibility of the figure, the reagent storages 80 and 85 and the sealing film 21 are omitted from (A) of FIG. 6, but are shown in (C) of FIG. 6, which is a BB cross section. All the functions will be described in (C) of FIG. 6. (B) of FIG. 6 is an AA cross section of (A) of FIG. 6, (C) of FIG. 6 is a BB cross section of (A) of FIG. 6, and (D) of FIG. 6 is a CC cross section of (A) of FIG. 6, in which the sample processing device and the driving unit 40 are in contact with each other via the membrane 20.

On the upper surface side of the analysis chip 10, as a plurality of containers shown in (A) of FIG. 4, the sample well 11, the mixing well 12, the disposal well 13, vertical holes 911 and 912 for introducing reagents, and circulation grooves 901, 902, 903, 904, 905, 906, 907, and 908 for purposes of introducing and circulating the air, and air reservoirs 915 and 916 are provided.

On the other hand, on the lower surface side of the analysis chip 10, a plurality of grooves 111, 112, 113, 114, 115, 116, 121, 122, 123, 124, 125, 126, 131, 132, 133, 134, 141, 142, 143, 144, and 145, which are shown in (B) of FIG. 4, are provided.

The membrane 20 is an elastic body made of a polymer compound such as rubber or a resin, which moves the fluid by being deformed pneumatically, and which seals the fluid by adhering to the respective surfaces of the analysis chip 10 and the driving unit 40.

The driving unit 40 is provided with recesses 41, 42, 43, 44, 45, 46, 47, 48, 49, 4A, 4B, 4C, 4D, and 4E constituting a plurality of recesses on the upper surface side that is adhered to the membrane 20. Two types of tubes from each recess, namely pressurization tubes 411, 421, 431, 441, 451, 461, 471, 481, 491, 4A1, 4B1, 4C1, 4D1, and 4E1 and depressurization tubes 412, 422, 432, 442, 452, 462, 472, 482, 492, 4A2, 4B2, 4C2, 4D2, and 4E2 are respectively connected with the air piping 70 shown in FIG. 5.

Figure 7:
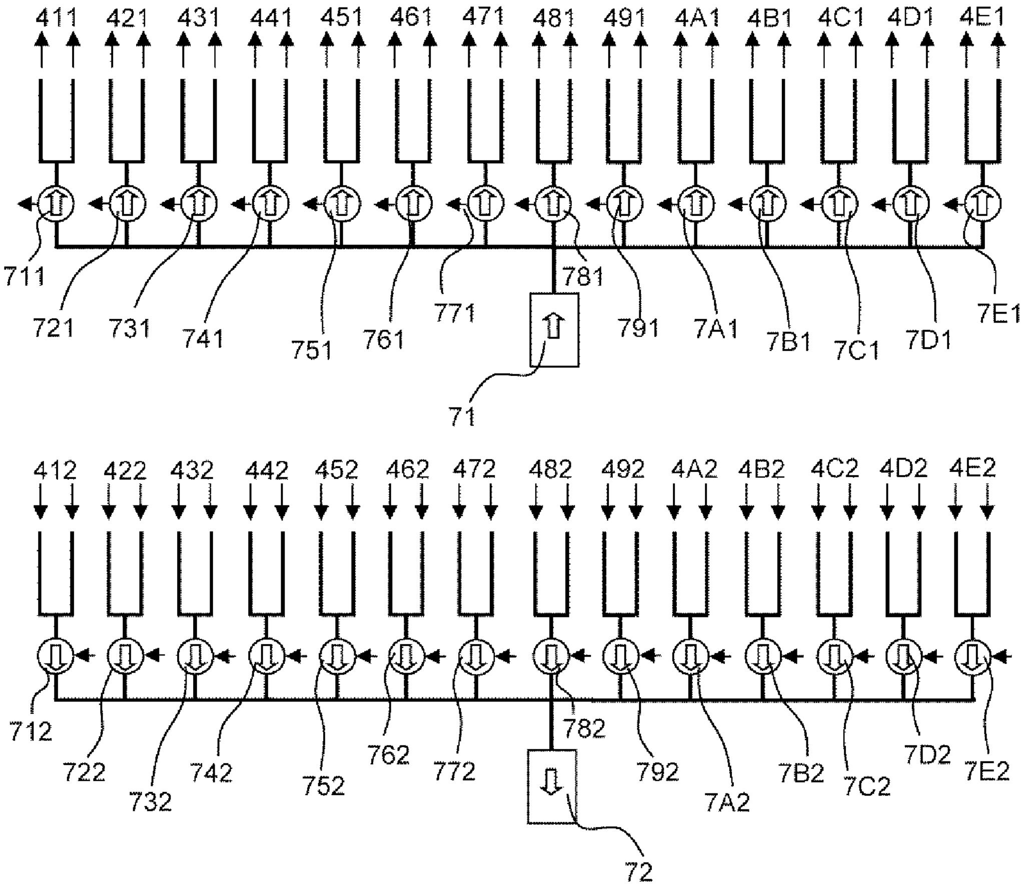
FIG. 7 is a system diagram of air piping for controlling the pressure of the driving unit according to the first embodiment.

FIG. 7 is a system diagram of air piping for controlling the pressure of the driving unit 40 in the present embodiment, and these are installed in the pneumatic controller 60. From the pressurization pump 71, fourteen systems are branched, and further two systems are respectively branched through pressurization solenoid valves 711, 721, 731, 741, 751, 761, 771, 781, 791, 7A1, 7B1, 7C1, 7D1, and 7E1, and are respectively connected with the pressurization tubes of the driving unit 40. The reason why the two systems are branched from a pressurization solenoid valve is that the two analysis chips 10 are mounted on the sample processing apparatus in the present embodiment as shown in (A) of FIG. 5. Similarly, fourteen systems are branched from a depressurization pump 72, and further two systems are branched through depressurization solenoid valves 712, 722, 732, 742, 752, 762, 772, 782, 792, 7A2, 7B2, 7C2, 7D2, and 7E2, and are respectively connected with the depressurization tubes of the driving unit 40.

When the pressurization solenoid valve 711 and the like are energized, the air piping communicates from the pump 71 to the driving unit 40, and the recess 41 and the like of the driving unit 40 are pressurized. On the other hand, when the pressurization solenoid valve 711 or the like is not energized, the air piping on the pump 71 side is closed, and an outflow from the air piping on the driving unit 40 side to the outside, that is, to the atmosphere side is enabled. However, an inflow into the air piping from the outside is not enabled.

When the depressurization solenoid valve 712 and the like are energized, the air piping communicates from the pump 72 to the driving unit 40, and the recesses 41 and the like of the driving unit 40 are depressurized. On the other hand, when the depressurization solenoid valve 712 or the like is not energized, the air piping on the pump 72 side is closed, and an inflow from the atmosphere side to the air piping on the driving unit 40 side is enabled. However, an outflow to the outside from the air piping is not enabled.

Figure 8:
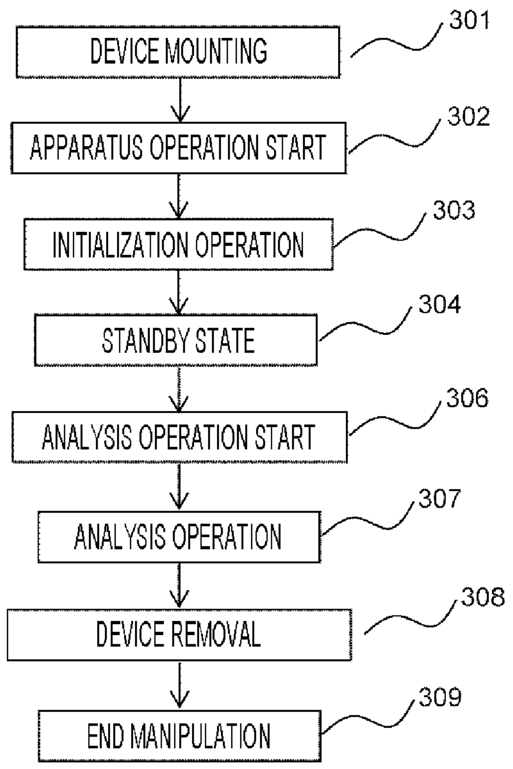
FIG. 8 is a diagram showing an example of a manipulation flow of the sample processing apparatus according to the first embodiment.

Hereinafter, a manipulation of the sample processing apparatus in the present embodiment will be described by using a manipulation flow of FIG. 8. As a state before the manipulation is started, the driving unit 40 is installed in the sample processing apparatus and the air piping 70 is connected. In device mounting 301, which is a first manipulation of the manipulation flow 301 to 309, a manipulator attaches the membrane 20 to the analysis chip 10, peels off the feeder film 23 attached to the sealing film 21, feeds a sample into the sample well 11, and attaches the feeder film 23 to seal the sample processing device, so that a sealed device is configured. The feeder film 23 to be reattached may not necessarily be the same one as the one that has been originally attached.

The sealed device configured as described above is mounted on the driving unit 40 with the membrane 20 facing downward, and the lid 50 is closed. This state is shown in (B) of FIG. 5. It is to be noted that here, the analysis chip 10 and the membrane 20 are separate members and are attached by the manipulator, but the analysis chip 10 and the membrane 20, which are integrated beforehand and packaged, may be used.

In next apparatus operation start 302, the manipulator selects a control procedure according to an analysis content by the manipulation unit 61 of (A) in FIG. 5, and the apparatus operation starts. The sample processing apparatus starts an initialization operation 303 for an open or close operation of a solenoid valve, a pressurization or depressurization manipulation by a pump, and checking of the pressure as needed. Then, with the pressurization pump 71 and the depressurization pump 72 operating, all the depressurization solenoid valve 712 and the like are closed.

Next, the manipulator issues an instruction for analysis operation start 306 from the manipulation unit 61, and the sample processing apparatus performs an analysis operation 307. When the analysis is completed, analysis results are stored in a memory in the sample processing apparatus, and are displayed on a display of the manipulation unit 61 or the like as needed.

When the analysis operation 307 is completed, in device removal 308, the manipulator removes the sample processing device 1 and stores or disposes of the sample processing device 1. In a case where there is a next analysis, the flow returns to the device mounting 301. A new sample processing device is mounted, and an analysis is performed. In a case where there is no more analysis, the manipulator performs an end manipulation 309 on the manipulation unit 61 to stop the operation of the apparatus.

Next, a detailed example of the analysis operation 307 of the sample processing apparatus in the present embodiment will be described with reference to FIG. 9. In reagent introduction 311 of FIG. 9, the reagents held in the reagent storages 80 and 85 are introduced into the circulation groove, which is an upper surface fluid channel and is provided on the upper surface side of the analysis chip 10, by using the extruding mechanisms 55 and 57.

Figure 10:
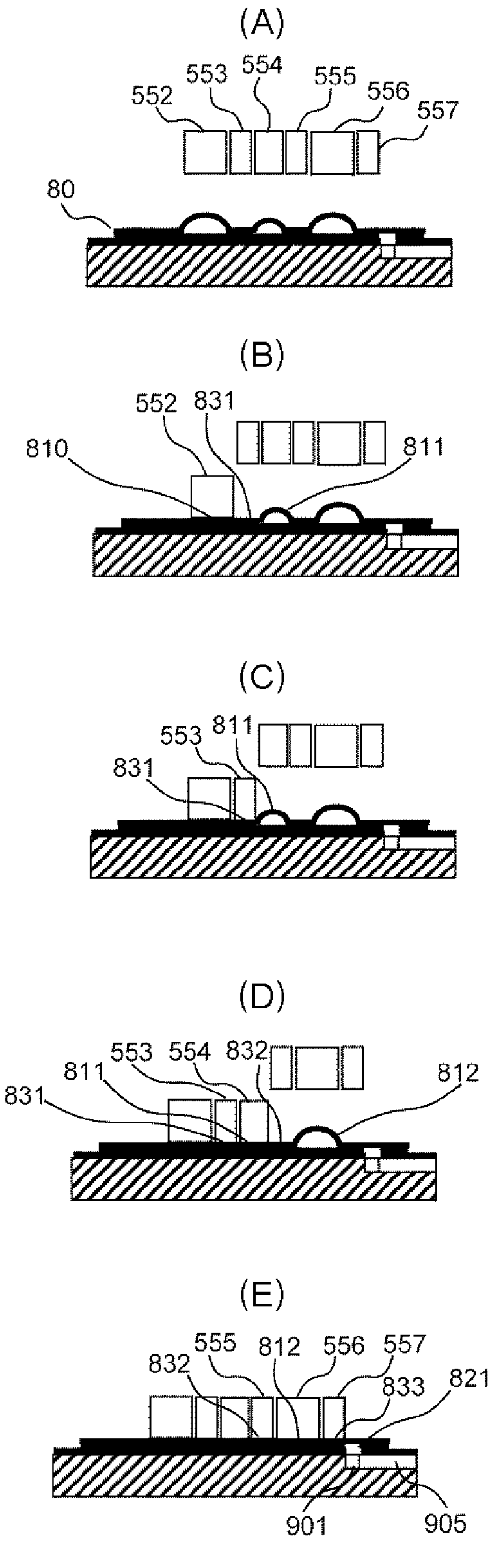
FIG. 10 is an explanatory diagram of a reagent introduction operation of the sample processing apparatus according to the first embodiment.

Hereinafter, details of the reagent introduction 311 will be described. First, the reagent introduction from the multi-liquid reagent storage 80 by using the multi-liquid extruding mechanism 55 will be described with reference to FIG. 10. FIG. 10 is an enlarged side cross-sectional view of a periphery of the multi-liquid reagent storage 80 of the sample processing device, and illustrates operations of six pressurization mechanisms constituting the multi-liquid extruding mechanism 55.

(A) of FIG. 10 shows an initial state before the reagent is introduced, and six pressurization mechanisms 552 to 557 are located above the multi-liquid reagent storage 80.

First, as shown in (B) of FIG. 10, by descending a first reagent chamber pressurization mechanism 552, the first reagent chamber 810 is pressurized. The first reagent chamber 810 is crushed, and the internal pressure increases to open the first-second reagent low-strength welding portion 831, and a first reagent in the inside flows out to the second reagent chamber 811 side.

Next, as shown in (C) of FIG. 10, by descending a first-second reagent low-strength joint portion pressurization mechanism 553, the first-second reagent low-strength joint portion 831 is pressurized.

Next, as shown in (D) of FIG. 10, by descending the second reagent chamber pressurization mechanism 554, the second reagent chamber 811 is pressurized. The second reagent chamber 811 is crushed, and the internal pressure increases to open the second-third reagent low-strength welding portion 832, and the first reagent and a second reagent in the inside flow out to the third reagent chamber 812 side. In this situation, the first-second reagent low-strength joint portion 831 is not opened because of being pressurized by the first-second reagent low-strength joint portion pressurization mechanism 553.

Similarly, as shown in (E) of FIG. 10, by descending each pressurization mechanism in the order of a second-third reagent low-strength joint portion pressurization mechanism 555, a third reagent chamber pressurization mechanism 556, and a third reagent low-strength joint portion pressurization mechanism 557, and by sequentially pressurizing the second-third reagent low-strength joint portion 832, the third reagent chamber 812, and the third reagent low-strength joint portion 833, all the reagents are introduced from the third reagent film removed portion 821 to the third reagent circulation groove 901.

The number of reagent chambers in the multi-liquid reagent storage 80 is not necessarily three, and may be four or more, or two. Alternatively, an empty reagent chamber in which no reagent is stored may be used.

The purpose of the multi-liquid reagent storage 80 is to sequentially introducing a plurality of reagents. In addition to this, the multi-liquid reagent storage 80 can be used for various purposes such as introduction of a slight amount of reagent and introduction of a dried reagent.

For example, the volume of the first reagent chamber 810 is made larger than the volume of the second reagent chamber 811, and a large amount of the first reagent in the first reagent chamber 810 is introduced into the second reagent chamber 811, which holds a small amount of the second reagent, and is then introduced into the analysis chip 10. Hence, a residual liquid amount, of a small amount of the second reagent, in the reagent storage can be reduced. Alternatively, a dried reagent can be stored in the second reagent chamber 811, and can be introduced into the analysis chip 10 after being dissolved with the liquid reagent in the first reagent chamber 810.

Figure 11:
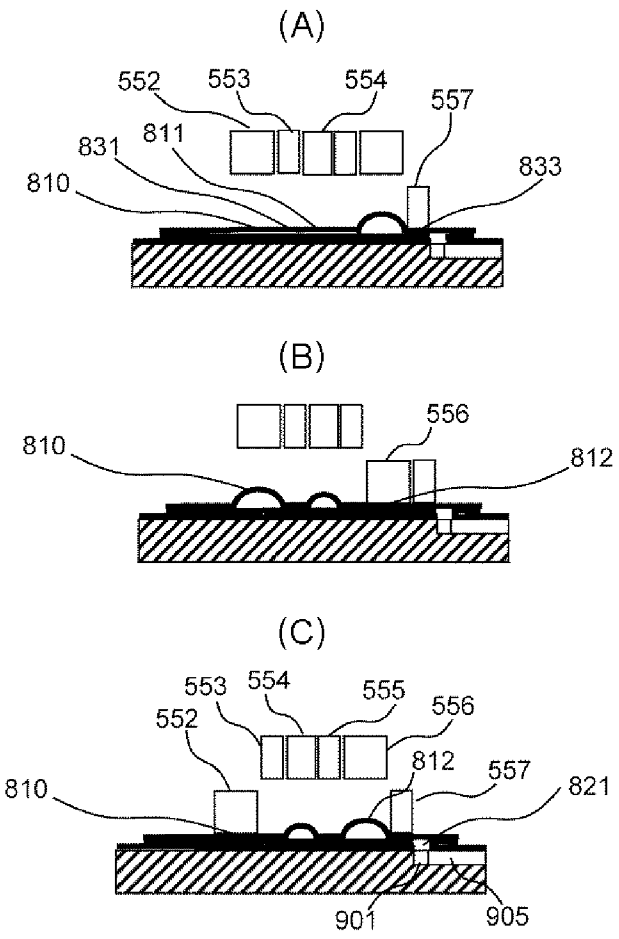
FIG. 11 is an explanatory diagram of the reagent introduction operation of the sample processing apparatus according to the first embodiment.

In addition, in a case where it is necessary to mix two types of reagents before being introduced into the analysis chip 10, a mixing manipulation shown in FIG. 11 may be performed. For example, after the manipulation of (D) of FIG. 10, as shown in (A) of FIG. 11, by descending the third reagent low-strength joint portion pressurization mechanism 557, pressurizing the third reagent low-strength joint portion 833, and by ascending the second reagent chamber pressurization mechanism 554, the first-second reagent low-strength joint portion pressurization machine 553, and the first reagent chamber pressurization mechanism 552, the pressurization of the second reagent chamber 811, the first-second reagent low-strength joint portion 831, and the first reagent chamber 810 is stopped.

Subsequently, as shown in (B) and (C) of FIG. 11, by repeating descending of the third reagent chamber pressurization mechanism 556 and descending of the first reagent chamber pressurization mechanism 552, the reagents are fluidized between the first reagent chamber 810 and the third reagent chamber 812, so that the reagents can be mixed together. Finally, by ascending the third reagent low-strength joint portion pressurization mechanism 557, and by descending each pressurization mechanism in the order of the first reagent chamber pressurization mechanism 552, the first-second reagent low-strength joint portion pressurization machine 553, the second reagent chamber pressurization mechanism 554, and the second-third reagent low-strength joint portion pressurization mechanism 555, the third reagent chamber pressurization mechanism 556, and the third reagent low-strength joint portion pressurization mechanism 557, the reagents after being mixed together is introduced from the third reagent film removed portion 821 to the third reagent circulation groove 901.

Heretofore, the reagent introduction from the multi-liquid reagent storage 80 by using the multi-liquid extruding mechanism 55 has been described.

Next, the reagent introduction from the single-liquid reagent storage 85 by using the single-liquid extruding mechanism 57 will be described with reference to FIG. 12.

Figure 12:
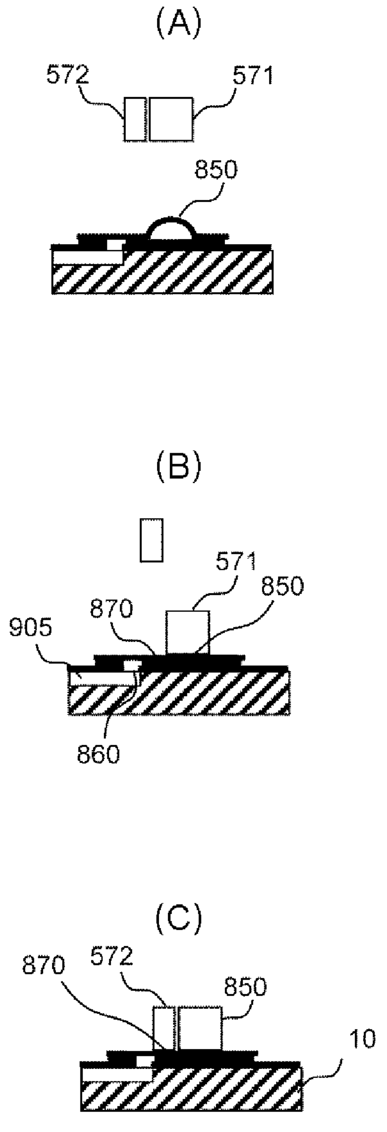
FIG. 12 is an explanatory diagram of the reagent introduction operation of the sample processing apparatus according to the first embodiment.

FIG. 12 is an enlarged side cross-sectional view of a periphery of the single-liquid reagent storage 85 of the sample processing device, and indicates an operation of two pressurization mechanisms constituting the multi-liquid extruding mechanism 57.

(A) of FIG. 12 shows an initial state before a reagent is introduced, and two pressurization mechanisms are located above the single-liquid reagent storage 85.

First, as shown in (B) of FIG. 12, by descending a fourth reagent chamber pressurization mechanism 571, the fourth reagent chamber 850 is pressurized. The fourth reagent chamber 850 is crushed and the internal pressure is increased to open the fourth reagent low-strength welding portion 870, and the fourth reagent in the inside is introduced from a fourth reagent film removed portion 860 to the central circulation groove 905 and the fourth reagent circulation groove 908 shown in (A) of FIG. 6.

Finally, as shown in (C) of FIG. 12, by descending a fourth reagent low-strength joint portion pressurization mechanism 572 and pressurizing the fourth reagent low-strength welding portion 870, the fourth reagent can be introduced into the analysis chip 10 without residual liquid.

Heretofore, the reagent introduction 311 from the single-liquid reagent storage 85 by using the single-liquid extruding mechanism 57 has been described. The above description of the reagent introduction 311 in FIG. 9 has been given.

Next, reagent fluidization 312 of FIG. 9 will be described. In the reagent fluidization 312, the reagent introduced into the central circulation groove 905 and the third reagent circulation groove 901 and the reagent introduced into the central circulation groove 905 and the fourth reagent circulation groove 908 are fluidized into the mixing well 12.

First, the fluidization of the reagent that has been introduced into the central circulation groove 905 and the third reagent circulation groove 901 will be described with reference to FIGS. 13, 14A, and 14B.

Figure 13:
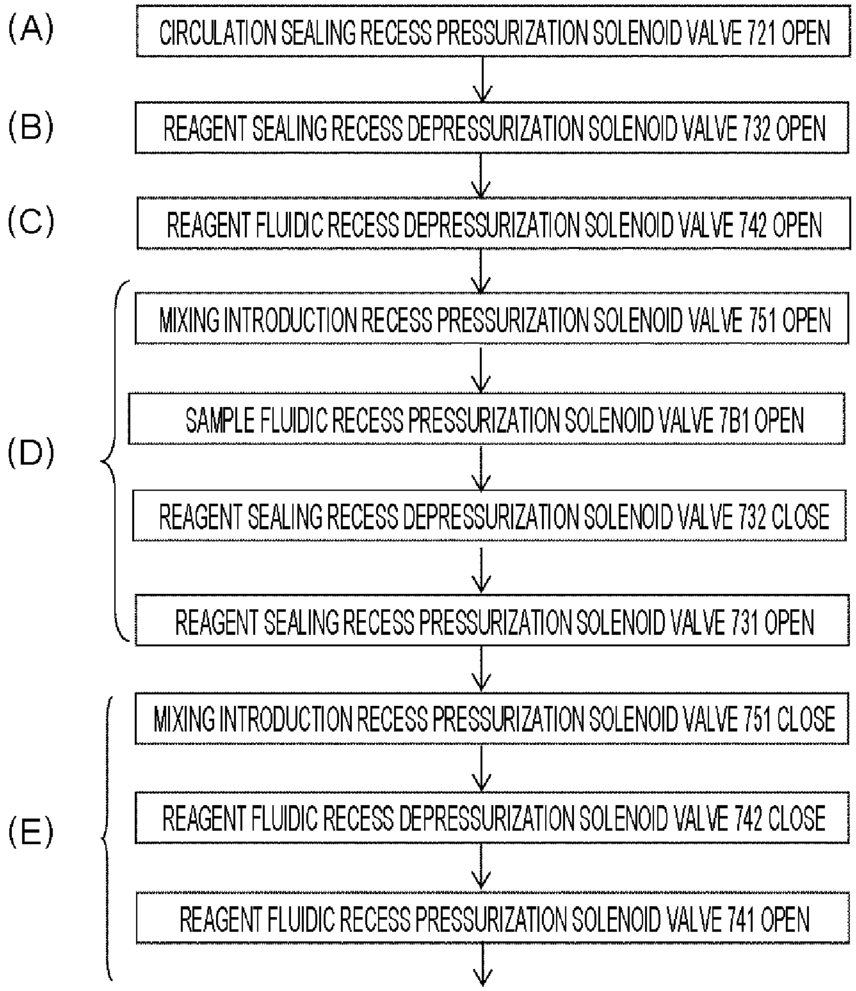
FIG. 13 is a diagram showing a reagent fluidic operation flow of the sample processing apparatus according to the first embodiment.
Figure 14A:
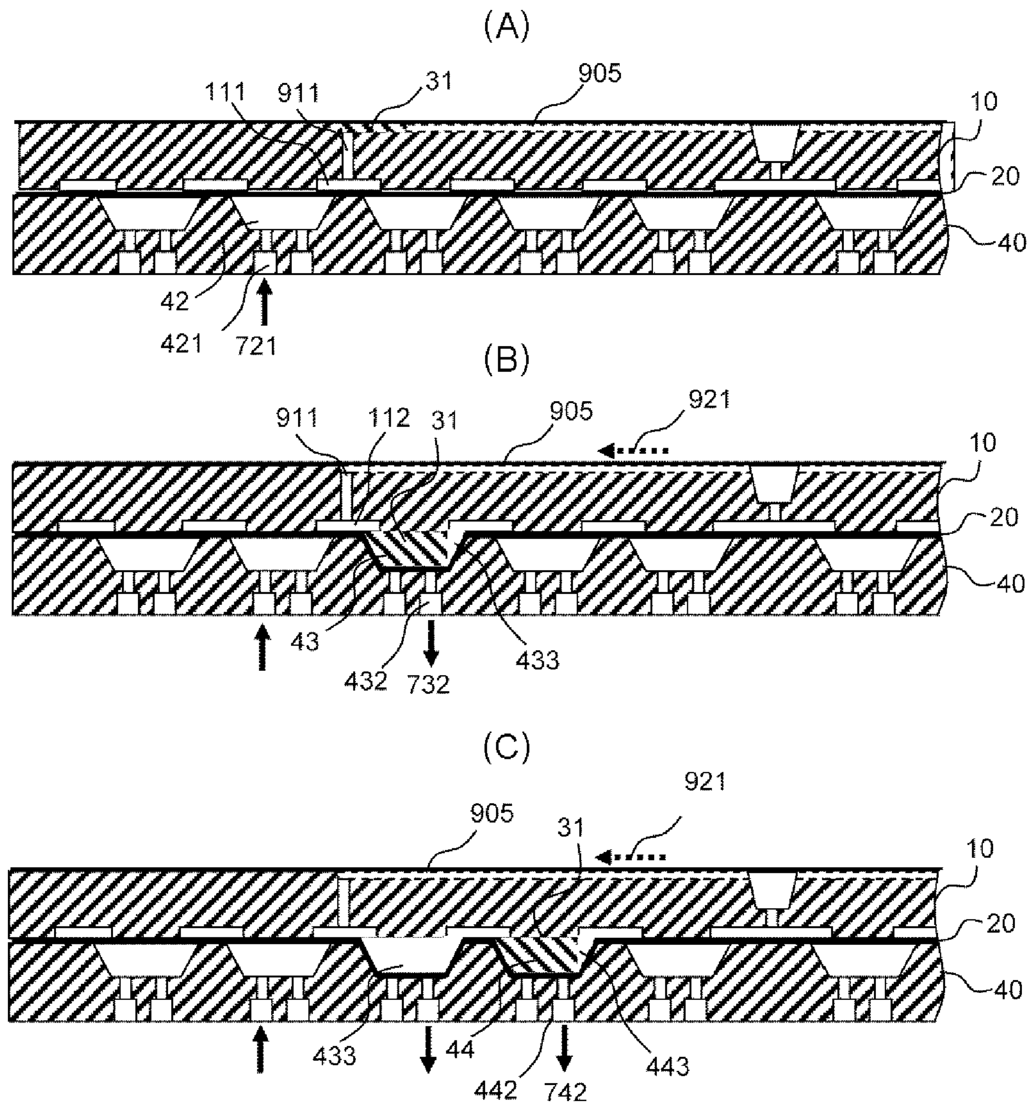
FIG. 14A is an explanatory diagram of the reagent fluidic operation of the sample processing apparatus according to the first embodiment.
Figure 14B:
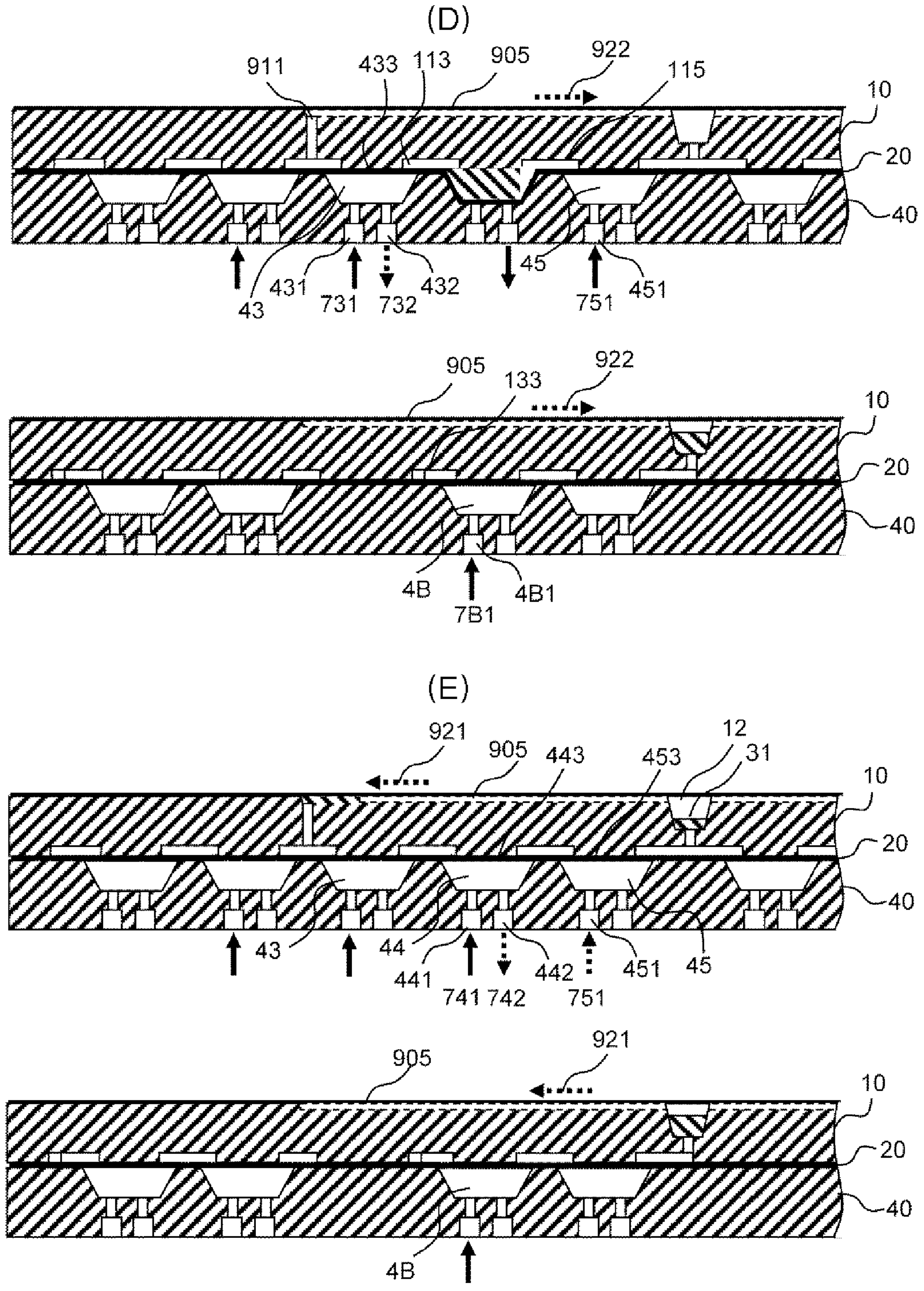
FIG. 14B is an explanatory diagram of a subsequent reagent fluidic operation of the sample processing apparatus according to the first embodiment.

FIG. 13 is a diagram showing a reagent fluidic operation flow by controlling opening and closing of pressurization solenoid valves and depressurization solenoid valves of the sample processing apparatus in the present embodiment, and FIGS. 14A and 14B are explanatory views of the reagent fluidic operation.

It is to be noted that solid arrows shown in FIGS. 14A and 14B indicate that the solenoid valves corresponding to the respective pressurization tubes and depressurization tubes are open. An upward solid arrow indicates that a recess is pressurized by opening a pressurization solenoid valve, and a downward solid arrow indicates that a recess is depressurized by opening a depressurization solenoid valve. The solenoid valves are closed where no solid arrow is applied, but a dashed arrow is used to indicate in particular that the solenoid valve is closed in the description of the referenced drawings. That is, an upward dashed arrow indicates that the pressurization solenoid valve has been switched from open to closed, and a downward dashed arrow indicates that the depressurization solenoid valve has been switched from open to closed.

Further, FIGS. 14A and 14B show a part of a cross section AA or a cross section CC of FIG. 6. However, an operation in the present embodiment will be described by indicating a part of the central circulation groove 905 in cross section BB with a broken line. A fluidic direction of the air in the central circulation groove 905 is indicated by a horizontal dashed arrow.

(A) of FIG. 13 and (A) of FIG. 14A (cross section AA) show a state immediately after a reagent 31 is introduced into the central circulation groove 905 and the third reagent circulation groove 901 in FIG. 6 from the multi-liquid reagent storage 80, which has been described in FIGS. 10 and 11. In the description of the reagent introduction, control of the solenoid valves has not been described. However, when the reagent is introduced, it is preferable that by opening the circulation sealing recess pressurization solenoid valve 721, the air is made to flow in from the circulation sealing recess pressurization tube 421, and by pressurizing the circulation sealing recess 42, the membrane 20 is pressed against the analysis chip 10 so as to prevent the reagent from flowing into the circulation sealing upstream groove 111 from the third reagent vertical hole 911.

By opening the reagent sealing recess depressurization solenoid valve 732 in (B) of FIG. 13 and (B) of FIG. 14A (cross section AA), the air is discharged from the reagent sealing recess depressurization tube 432 to depressurize the reagent sealing recess 43. In this situation, since the membrane 20 is pulled to a bottom surface of the reagent sealing recess 43, a reagent sealing portion gap 433 is generated between the membrane 20 and the analysis chip 10 to draw the reagent 31 from the central circulation groove 905 and the third reagent circulation groove 901 through the third reagent vertical hole 911 and the reagent sealing upstream groove 112 into the reagent sealing portion gap 433.

In this situation, since the sample 31 flows out of the central circulation groove 905 and the third reagent circulation groove 901, the air in the central circulation groove 905 expands and the pressure tends to decrease. However, as shown in (A) of FIG. 6, the central circulation groove 905 is connected with the wells 11, 12, and 13 and the air reservoirs 915 and 916 through the circulation grooves 903, 904, 906, 907 and 908. Hence, as indicated by a dashed arrow 921 in (B) of FIG. 14A, the air flows into the central circulation groove 905, and the pressure in the central circulation groove 905 hardly decreases.

Strictly speaking, the initial air in the wells and the circulation grooves provided on the upper surface side of the analysis chip 10 expands by the volume corresponding to the sample sucked into the reagent sealing recess 43 or the like, but the amount of the above initial air is much larger than the amount of expansion, and a decrease in pressure is small. In particular, the provision of the air reservoir 915 or the like increases the volume of the initial air (see (A) in FIG. 6), and a pressure drop in the circulation groove becomes negligibly small.

Next, in (C) of FIG. 13 and (C) of FIG. 14A (cross section AA), by opening the reagent fluidic recess depressurization solenoid valve 742, the air is discharged from the reagent fluidic recess depressurization tube 442, and the reagent fluidic recess 44 is depressurized. In this situation, since the membrane 20 is pulled to the bottom surface of the reagent fluidic recess 44, a reagent fluidic portion gap 443 is generated between the membrane 20 and the analysis chip 10 to draw the reagent 31 from the reagent sealing portion gap 433 into the reagent fluidic portion gap 443.

In this situation, as indicated by the dashed arrow 921 in (C) of FIG. 14A, the air flows into the central circulation groove 905, and the pressure in the central circulation groove 905 hardly decreases.

Next, in (D) of FIG. 13 and (D) of FIG. 14B (cross section AA and cross section CC), by opening the mixing introduction recess pressurization solenoid valve 751, the air is made to flow from the mixing introduction recess pressurization tube 451. By pressurizing the mixing introduction recess 45 and by opening the sample fluidic recess pressurization solenoid valve 7B1, the air is made to flow from the sample fluidic recess pressurization tube 4B1 to pressurize the sample fluidic recess 4B. In this situation, the membrane 20 is pressed against the analysis chip 10 side to seal the mixing introduction upstream groove 115 and the sample fluidic downstream groove 133. Next, by closing the reagent sealing recess depressurization solenoid valve 732, the outflow of the air from the reagent sealing recess depressurization tube 432 is stopped. By opening the reagent sealing recess pressurization solenoid valve 731, the air is made to flow in from the reagent sealing recess pressurization tube 431 to pressurize the reagent sealing recess 43. In this situation, the membrane 20 is pressed against the analysis chip 10 side to return the fluid in the reagent sealing portion gap 433 to the third reagent vertical hole 911 side, and to seal the reagent sealing downstream groove 113.

In this situation, as indicated by a dashed arrow 922 in (D) of FIG. 14B, the air flows into the central circulation groove 905, and the pressure in the central circulation groove 905 hardly decreases.

Next, in (E) of FIG. 13 and (E) of FIG. 14B (cross section AA and cross section CC), by closing the mixing introduction recess pressurization solenoid valve 751, the inflow of the air from the mixing introduction recess pressurization tube 451 is stopped, and the pressurization of the membrane 20 is stopped. By closing the reagent fluidic recess depressurization solenoid valve 742, the outflow of the air from the reagent fluidic recess depressurization tube 442 is stopped. By opening the reagent fluidic recess pressurization solenoid valve 741, the air is made to flow from the reagent flow recess pressurization tube 441 to pressurize the reagent fluidic recess 44. In this situation, the membrane 20 is pressed against the analysis chip 10 side to push out the reagent 31 in the reagent fluidic portion gap 443. In this situation, since the reagent sealing recess 43 and the sample fluidic recess 4B are pressurized, the reagent 31 flows out to the mixing introduction recess 45 side. Since the mixing introduction recess 45 is neither pressurized nor depressurized, the reagent 31 pushes and opens the mixing introduction portion gap 453, which is a gap between the fluidic chip 10 and the membrane 20, and flows out to the mixing well 12.

In this situation, as indicated by the dashed arrow 921 in (E) of FIG. 14B, the air flows into the central circulation groove 905, and the pressure in the central circulation groove 905 hardly decreases.

Heretofore, the operation of fluidizing the reagent, which has been introduced into the central circulation groove 905 and the third reagent circulation groove 901, into the mixing well 12 has been described. Next, the fluidization of the reagent introduced into the central circulation groove 905 and the fourth reagent circulation groove 908 will be described with reference to FIGS. 15, 16A and 16B.

Figure 15:
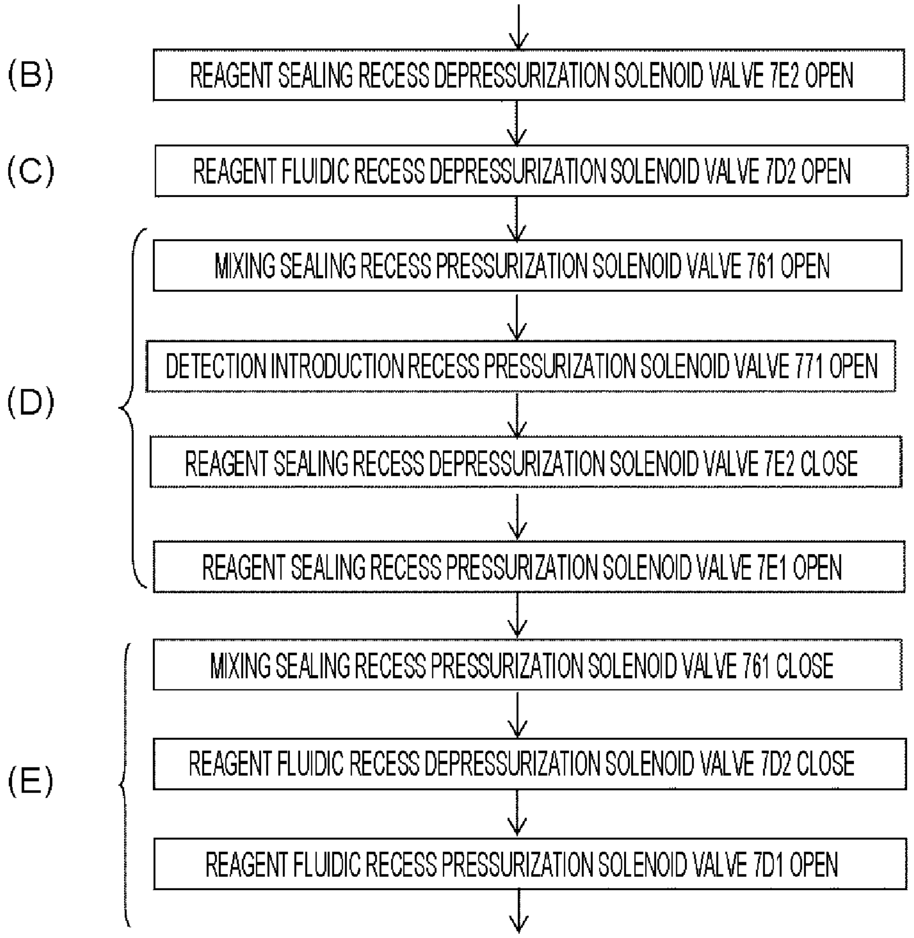
FIG. 15 is a diagram showing a reagent fluidic operation flow of the sample processing apparatus according to the first embodiment.
Figure 16A:
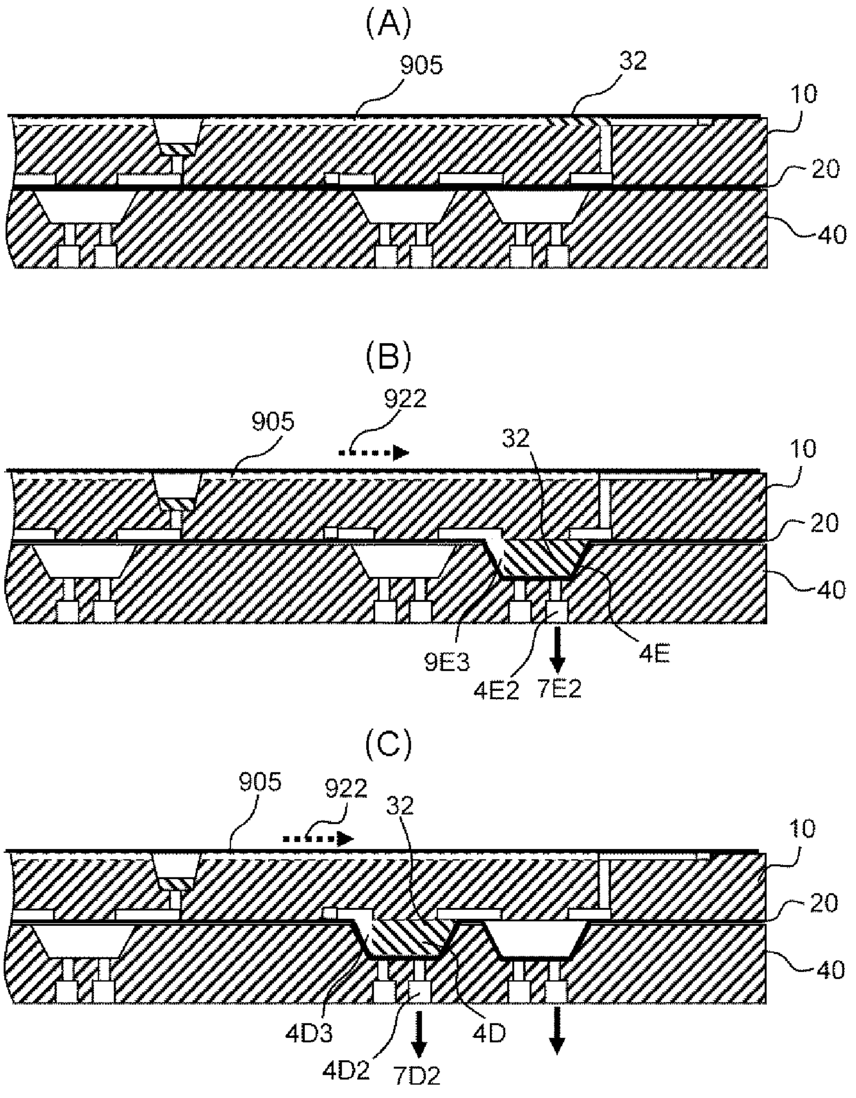
FIG. 16A is an explanatory diagram of the reagent fluidic operation of the sample processing apparatus according to the first embodiment.
Figure 16B:
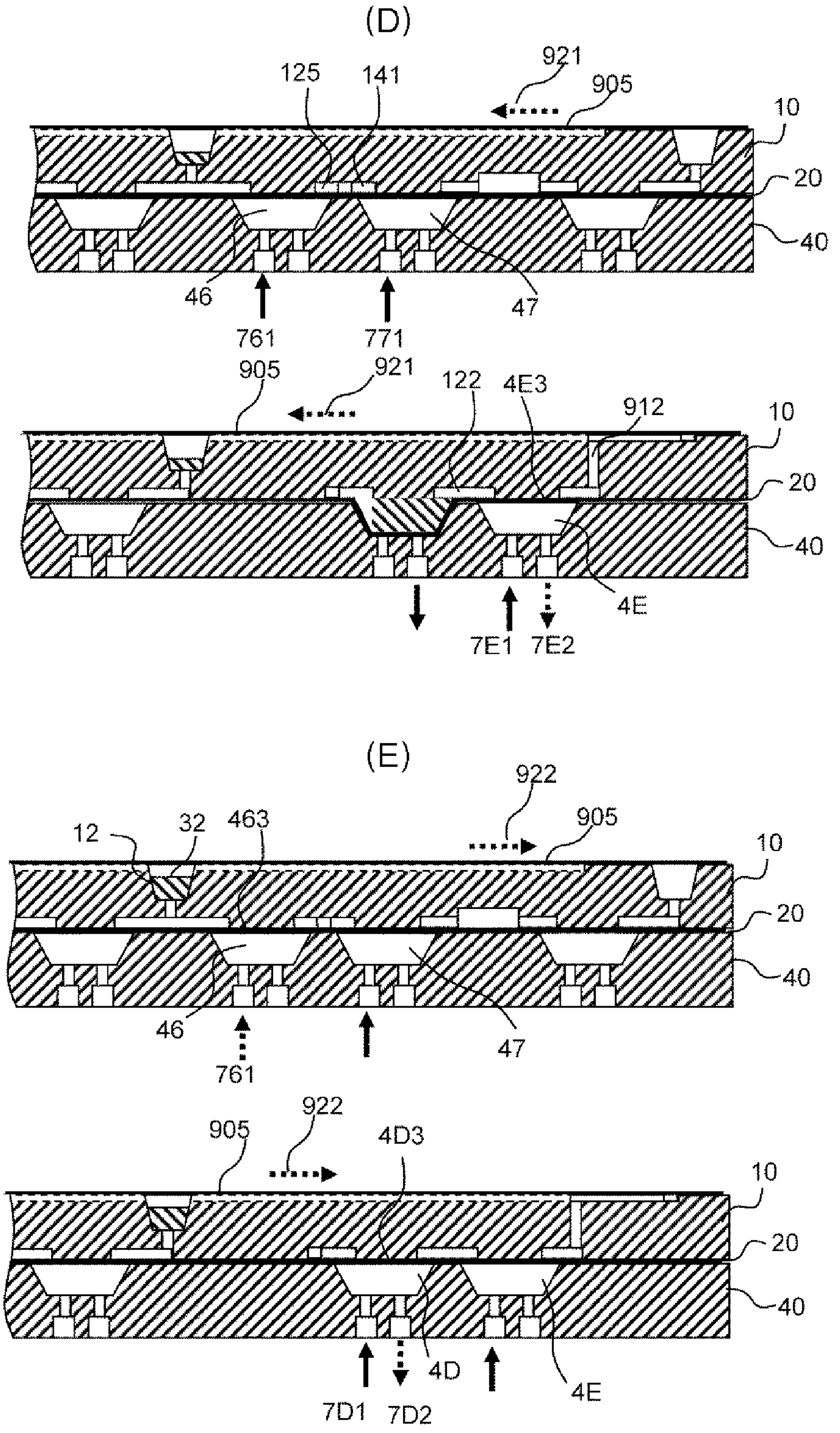
FIG. 16B is an explanatory diagram of a subsequent reagent fluidic operation of the sample processing apparatus according to the first embodiment.

FIG. 15 is a diagram showing a reagent fluidic operation flow by controlling opening and closing of the pressurization solenoid valves and the depressurization solenoid valves of the sample processing apparatus in the present embodiment, and FIGS. 16A and 16B are explanatory views of the reagent fluidic operation.

(A) of FIG. 16A (cross section CC) shows a state immediately after a reagent 32 is introduced from the single-liquid reagent storage 85 described in FIG. 12 into the central circulation groove 905 and the fourth reagent circulation groove 908 of FIG. 6. Hereinafter, the liquid is fluidized by a switching manipulation of the solenoid valve similar to that described with reference to FIGS. 13 and 14A and 14B.

By opening the reagent sealing recess depressurization solenoid valve 7E2 in (B) of FIG. 15 and (B) of FIG. 16A (cross section CC), the air is discharged from the reagent sealing recess depressurization tube 4E2 to depressurize the reagent sealing recess 4E. In this situation, a reagent sealing portion gap 4E3 is generated between the membrane 20 and the analysis chip 10 to draw the reagent 32. In this situation, as indicated by the dashed arrow 922 in (B) of FIG. 16A, the air flows into the central circulation groove 905, and the pressure in the central circulation groove 905 hardly decreases.

Next, in (C) of FIG. 15 and (C) (cross section AA) of FIG. 16A, by opening the reagent fluidic recess depressurization solenoid valve 7D2, the air is discharged from the reagent fluidic recess depressurization tube 4D2 to depressurize the reagent fluidic recess 4D. In this situation, a reagent fluidic portion gap 4D3 is generated between the membrane 20 and the analysis chip 10 to draw the reagent 32.

In this situation, as indicated by the dashed arrow 922 in (C) of FIG. 16A, the air flows into the central circulation groove 905, and the pressure in the central circulation groove 905 hardly decreases.

Next, in (D) of FIG. 15 and (D) of FIG. 16B (cross section AA and cross section CC), by opening the mixing sealing recess pressurization solenoid valve 761, the mixing sealing recess 46 is pressurized. By opening the detection introduction recess pressurization solenoid valve 771, the detection introduction recess 47 is pressurized. In this situation, the membrane 20 is pressed against the analysis chip 10 side to seal the mixing sealing downstream groove 125 and the detection introduction upstream groove 141. Next, by closing the reagent sealing recess depressurization solenoid valve 7E2 and opening the reagent sealing recess pressurization solenoid valve 7E1, the reagent sealing recess 4E is pressurized. In this situation, the fluid in the reagent sealing portion gap 4E3 returns to the fourth reagent vertical hole 912 side, and also seals the reagent sealing downstream groove 122.

In this situation, as indicated by the dashed arrow 921 in (D) of FIG. 16B, the air flows into the central circulation groove 905, and the pressure in the central circulation groove 905 hardly decreases.

Next, in (E) of FIG. 15 and (E) of FIG. 16B (cross section AA and cross section CC), by closing the mixing sealing recess pressurization solenoid valve 761, closing the reagent fluidic recess depressurization solenoid valve 7D2, and opening the reagent fluidic recess pressurization solenoid valve 7D1, the reagent fluidic recess 4D is pressurized. In this situation, the reagent 32 in the reagent fluidic portion gap 4D3 is extruded. In this situation, since the reagent sealing recess 4E and the detection introduction recess 47 are pressurized, the reagent 32 flows out to the mixing sealing recess 46 side. Since the mixing sealing recess 46 is not pressurized, the reagent 32 pushes and opens the mixing sealing portion gap 463, which is a gap between the fluidic chip 10 and the membrane 20, and flows out to the mixing well 12.

In this situation, as indicated by the dashed arrow 922 in (E) of FIG. 16B, the air flows into the central circulation groove 905, and the pressure in the central circulation groove 905 hardly decreases.

Heretofore, the operation of fluidizing the reagent, which has been introduced into the fourth reagent circulation groove 908, into the mixing well 12 has been described.

In the above-described reagent fluidic manipulation, the reagent that has been introduced into the circulation groove provided on the upper surface side of the analysis chip 10 is sucked into each groove 112 or the like and each gap 433 or the like on the lower surface side. The circulation grooves on the upper surface side communicate with the respective grooves on both ends, on the way, and on the lower surface side, and there is no dead end. Therefore, by directly introducing a reagent into the circulation groove on the upper surface side, the entire amount can be sucked into the groove on the lower surface side. In particular, by arranging the film removed portions 821 and 860 of the reagent storages 80 and 85 on upper parts such as the circulation grooves and the like on the upper surface side of the analysis chip 10 as respectively shown in (E) of FIG. 10 and (B) of FIG. 12, no dead space between the reagent storage and the circulation groove is created, and a slight amount of reagent can be fluidized without residual liquid.

Figure 9:
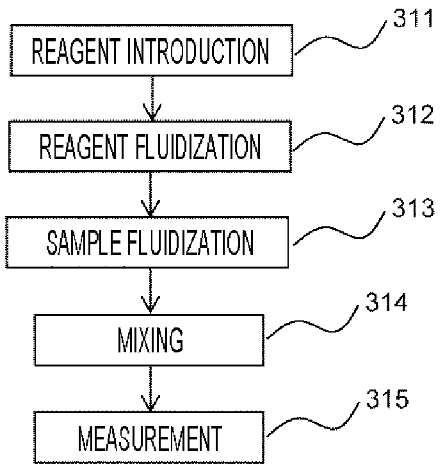
FIG. 9 is a diagram showing an example of an analysis operation flow of the sample processing apparatus according to the first embodiment.

Heretofore, the operation of the reagent fluidization 312 in FIG. 9 has been described. Next, sample fluidization 313 of FIG. 9 will be described with reference to FIGS. 17, 18A, and 18B.

Figure 17:
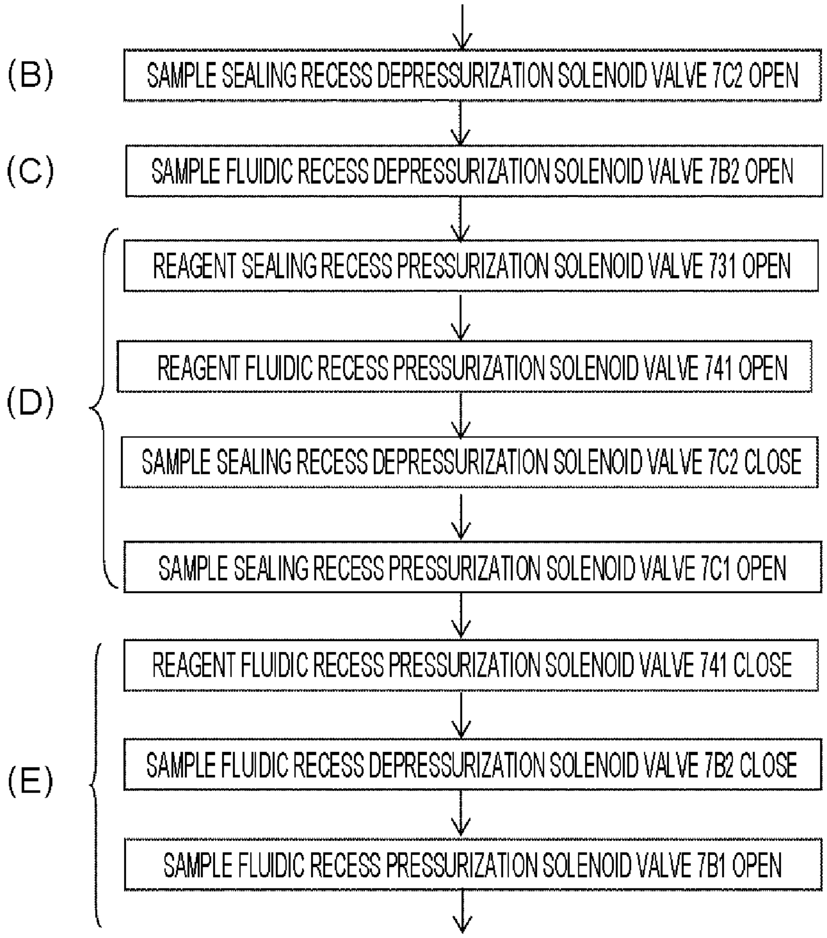
FIG. 17 is a diagram showing a sample fluidic operation flow of the sample processing apparatus according to the first embodiment.
Figure 18A:
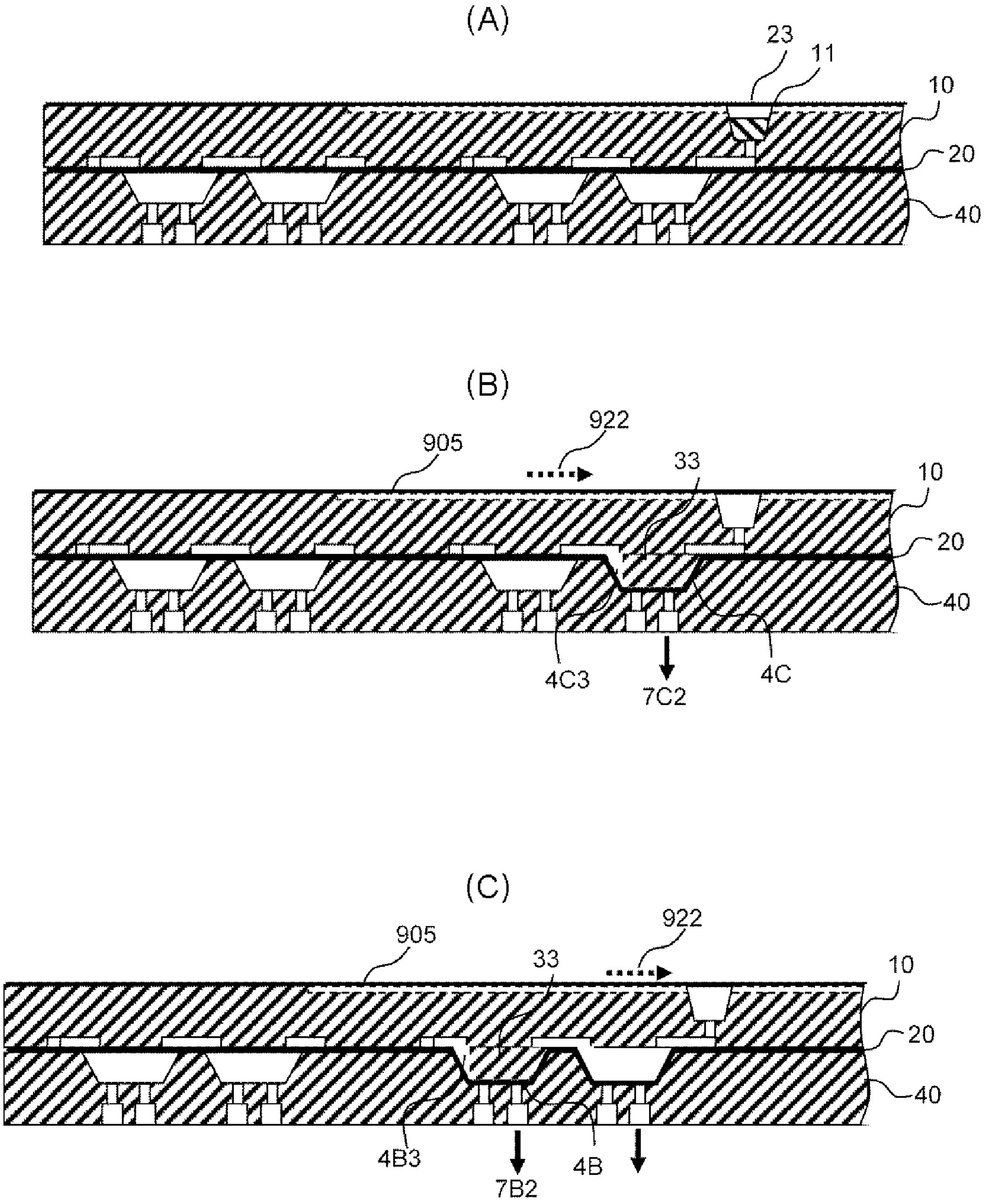
FIG. 18A is an explanatory diagram of a sample fluidic operation of the sample processing apparatus according to the first embodiment.
Figure 18B:
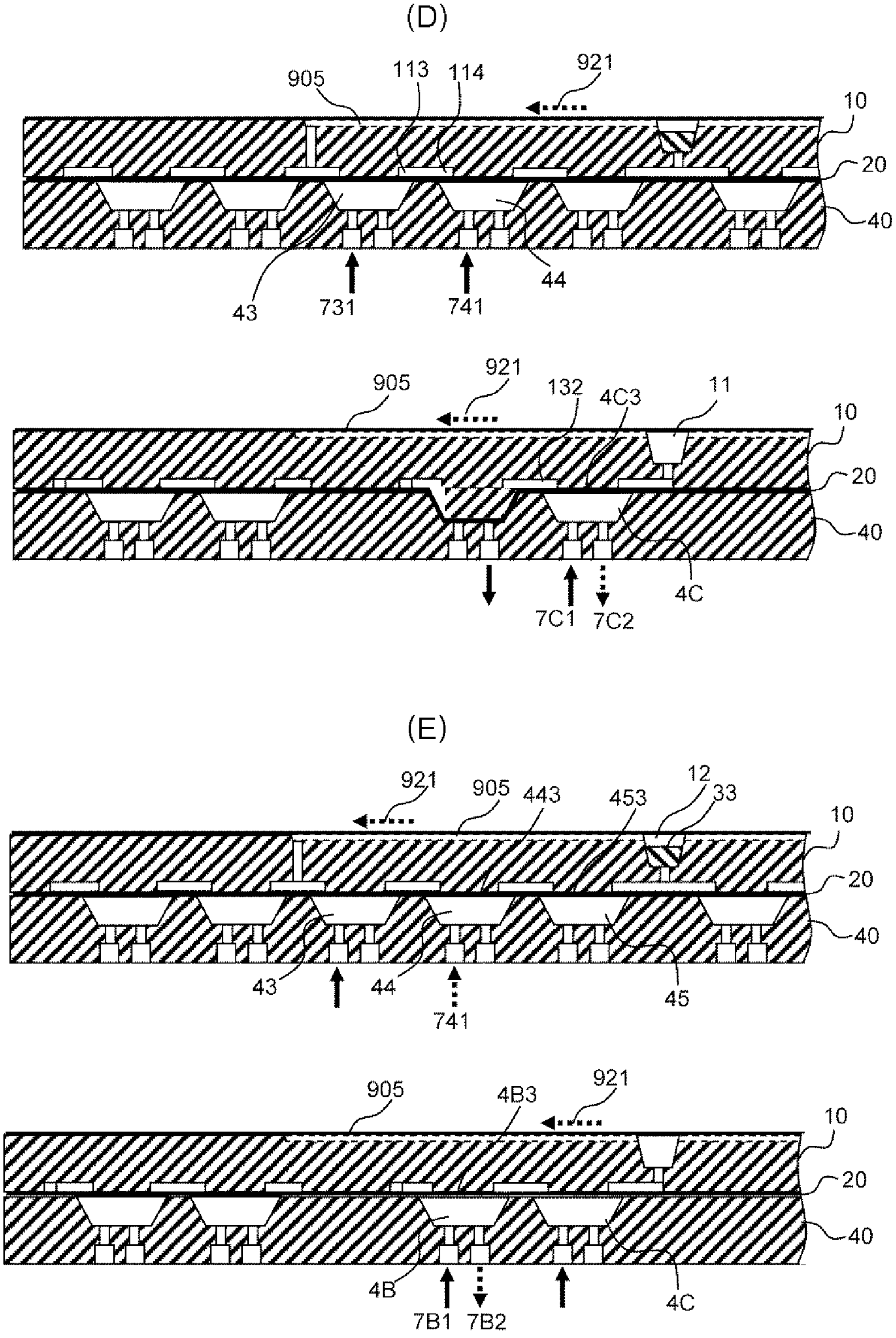
FIG. 18B is an explanatory diagram of a subsequent sample fluidic operation of the sample processing apparatus according to the first embodiment.

FIG. 17 is a diagram showing a sample fluidic operation flow by controlling opening and closing of the pressurization solenoid valves and the depressurization solenoid valves of the sample processing apparatus in the present embodiment, and FIGS. 18A and 18B are explanatory views of the sample fluidic operation.

(A) of FIG. 18A (cross section CC) shows a state in which a sample is dispensed into the sample well 11 and is sealed with the feeder film 23. Hereinafter, the liquid is fluidized by a switching manipulation of the solenoid valve similar to the manipulation that has been described with reference to FIGS. 13 and 14.

By opening the sample sealing recess depressurization solenoid valve 7C2 in (B) of FIG. 17 and (B) of FIG. 18A (cross section CC), the sample sealing recess 4C is depressurized. In this situation, a sample sealing portion gap 4C3 is generated between the membrane 20 and the analysis chip 10 to draw the sample 33.

In this situation, as indicated by the dashed arrow 922 in (B) of FIG. 18, the air flows into the central circulation groove 905, and the pressure in the central circulation groove 905 hardly decreases.

Next, in (C) of FIG. 17 and (C) of FIG. 18A (cross section CC), by opening the sample fluidic recess depressurization solenoid valve 7B2, the sample fluidic recess 4B is depressurized. In this situation, a sample fluidic portion gap 4B3 is generated between the membrane 20 and the analysis chip 10 to draw the sample 33.

In this situation, as indicated by the dashed arrow 922 in (C) of FIG. 18A, the air flows into the central circulation groove 905, and the pressure in the central circulation groove 905 hardly decreases.

Next, in (D) of FIG. 17 and (D) of FIG. 18B (cross section AA and cross section CC), by opening the reagent sealing recess pressurization solenoid valve 731, the reagent sealing recess 43 is pressurized. By opening the reagent fluidic recess pressurization solenoid valve 741, the reagent fluidic recess 44 is pressurized. In this situation, the membrane 20 is pressed against the analysis chip 10 side to seal the reagent sealing downstream groove 113 and the reagent fluidic upstream groove 114. Next, by closing the sample sealing recess depressurization solenoid valve 7C2 and opening the sample sealing recess pressurization solenoid valve 7C1, the sample sealing recess 4C is pressurized. In this situation, the fluid in the sample sealing portion gap 4C3 returns to the sample well 11, and seals the sample sealing downstream groove 132.

In this situation, as indicated by the dashed arrow 921 in (D) of FIG. 18B, the air flows into the central circulation groove 905, and the pressure in the central circulation groove 905 hardly decreases.

Next, in (E) of FIG. 17 and (E) of FIG. 18B (cross section AA and cross section CC), by closing the reagent fluidic recess pressurization solenoid valve 741, closing the sample fluidic recess depressurization solenoid valve 7B2, and opening the sample fluidic recess pressurization solenoid valve 7B1, the sample fluidic recess 4B is pressurized. In this situation, the sample 33 in the sample fluidic portion gap 4B3 is extruded. In this situation, since the sample sealing recess 4C and the reagent sealing recess 43 are pressurized, the sample 33 flows out to the reagent fluidic recess 44 side. Since the reagent fluidic recess 44 and the mixing introduction recess 45 are not pressurized, the sample 33 pushes and opens the reagent fluidic portion gap 443 and the mixing introduction portion gap 453, which are gaps between the fluidic chip 10 and the membrane 20, and flows out to the mixing well 12.

In this situation, as indicated by the dashed arrow 921 in (E) of FIG. 18B, the air flows into the central circulation groove 905, and the pressure in the central circulation groove 905 hardly decreases.

Heretofore, the sample fluidization 313 in FIG. 9 has been described. Next, mixing 314 of FIG. 9 will be described with reference to FIGS. 19 and 20.

Figure 19:
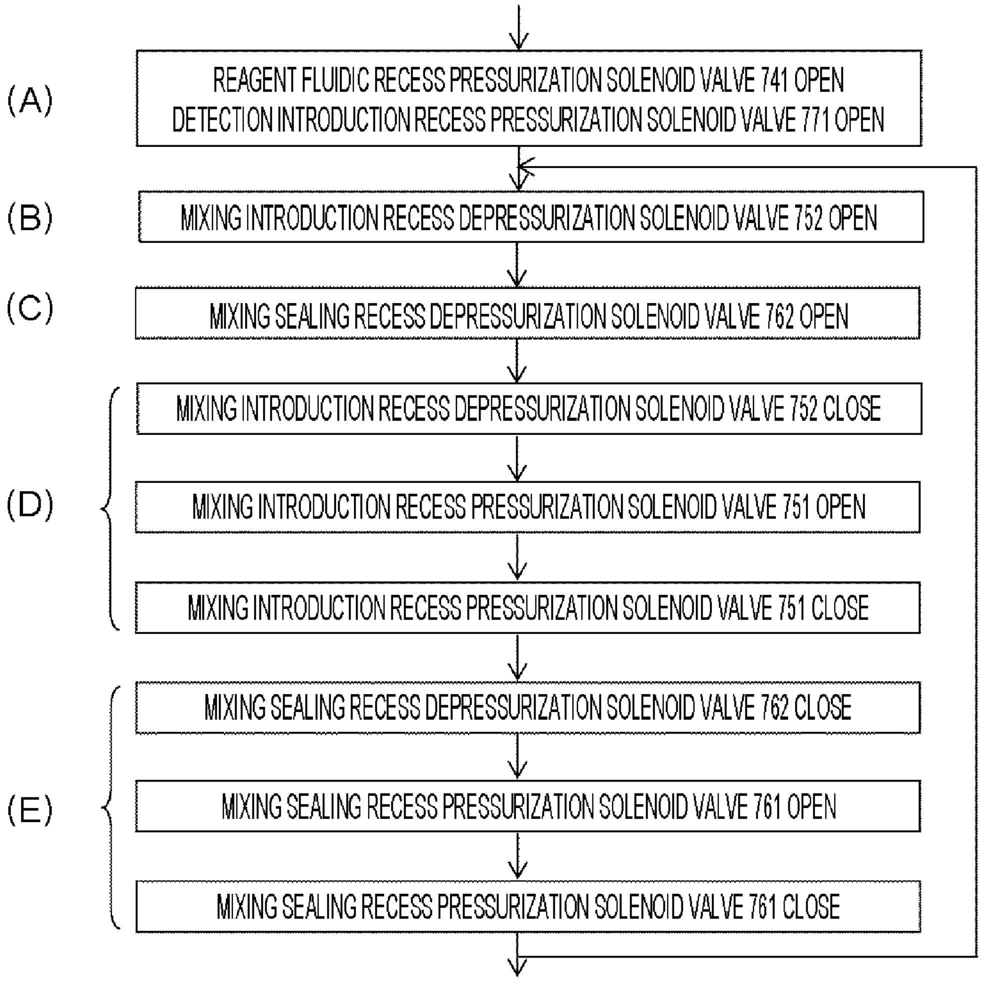
FIG. 19 is a diagram showing a mixing operation flow of the sample processing apparatus according to the first embodiment.
Figure 20:
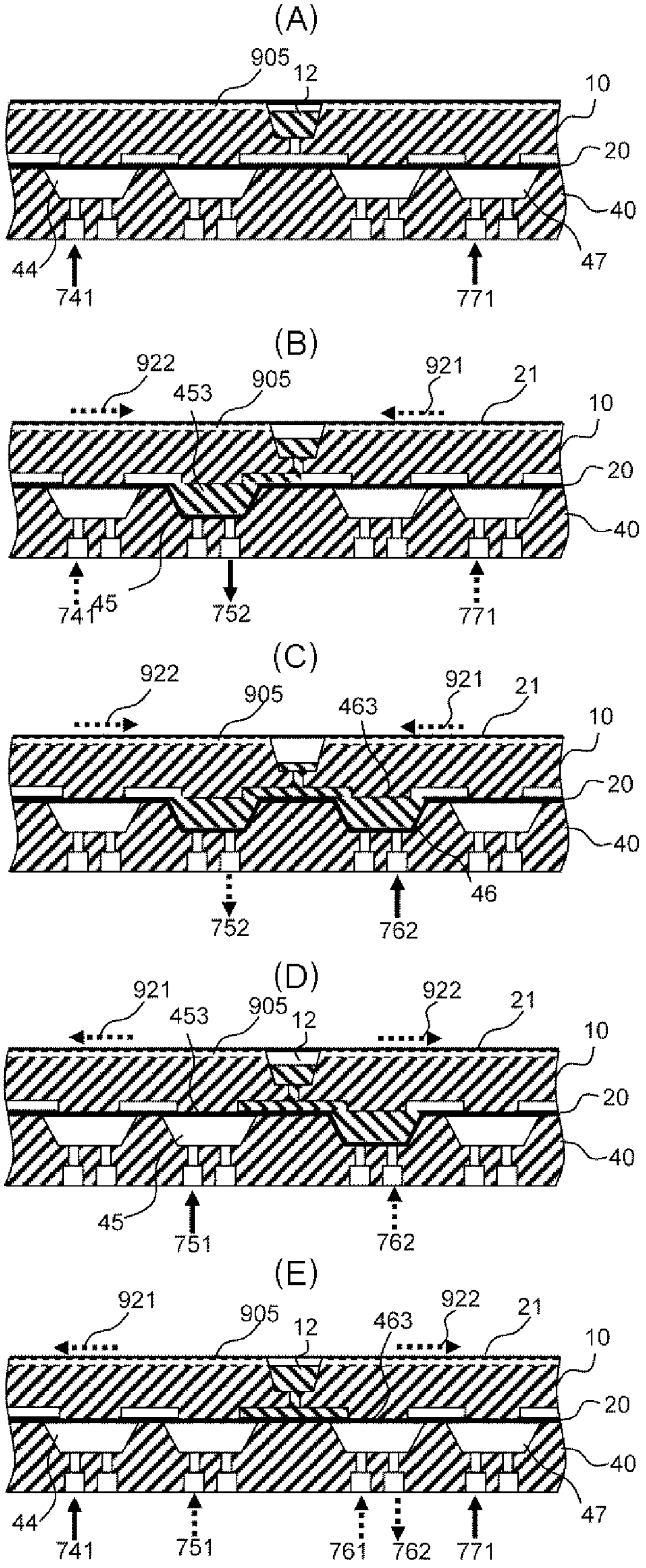
FIG. 20 is an explanatory diagram of a mixing operation of the sample processing apparatus according to the first embodiment.

FIG. 19 is a diagram showing a mixing operation flow by controlling opening and closing of the pressurization solenoid valves and the depressurization solenoid valves of the sample processing apparatus in the present embodiment, and FIG. 20 is an explanatory diagram of the mixing operation.

In (A) of FIG. 19 and (A) of FIG. 20 (cross section AA), in a state where a sample that contains a plurality of liquids and a reagent mixed in the mixing well 12 are held, by opening the reagent fluidic recess pressurization solenoid valve 741 and the detection introduction recess pressurization solenoid valve 771, the cutout recess 44 and the detection introduction recess 47 are pressurized and sealed.

In (B) of FIG. 19 and (B) of FIG. 20 (cross section AA), by opening the mixing introduction recess depressurization solenoid valve 752, the mixing introduction recess 45 is depressurized to draw the liquid into the mixing introduction portion gap 453, which is a gap generated between the membrane 20 and the analysis chip 10. In this situation, as indicated by the dashed arrows 921 and 922, the air flows into the mixing well 12 through the central circulation groove 905 and the like.

In (C) of FIG. 19 and (C) of FIG. 20 (cross section AA), by opening the mixing sealing recess depressurization solenoid valve 762, the mixing sealing recess 46 is depressurized to draw the liquid into the mixing sealing portion gap 463, which is a gap generated between the membrane 20 and the analysis chip 10. In this situation, as indicated by the dashed arrows 921 and 922, the air flows into the mixing well 12 through the central circulation groove 905 and the like.

In (D) of FIG. 19 and (D) of FIG. 20 (cross section AA), by closing the mixing introduction recess depressurization solenoid valve 752 and opening the mixing introduction recess pressurization solenoid valve 751, the mixing introduction recess 45 is pressurized, the liquid in the mixing introduction portion gap 453 is returned to the mixing well 12, and the mixing introduction recess pressurization solenoid valve 751 is closed. In this situation, as indicated by the dashed arrows 921 and 922, the air flows out of the mixing well 12 through the central circulation groove 905 and the like.

In (E) of FIG. 19 and (E) of FIG. 20 (cross section AA), by closing the mixing sealing recess depressurization solenoid valve 762 and opening the mixing sealing recess pressurization solenoid valve 761, the liquid in the mixing sealing portion gap 463 is returned to the mixing well 12, and the mixing sealing recess pressurization solenoid valve 761 is closed. In this situation, as indicated by the dashed arrows 921 and 922, the air flows out of the mixing well 12 through the central circulation groove 905 and the like.

By repeating the above manipulations (B) to (E), the liquid in the mixing well 12 moves to the mixing introduction recess 45 and the mixing sealing recess 46, and is mixed whenever the liquid returns again. Heretofore, the operation of the mixing 314 in FIG. 9 has been described.

Figure 21:
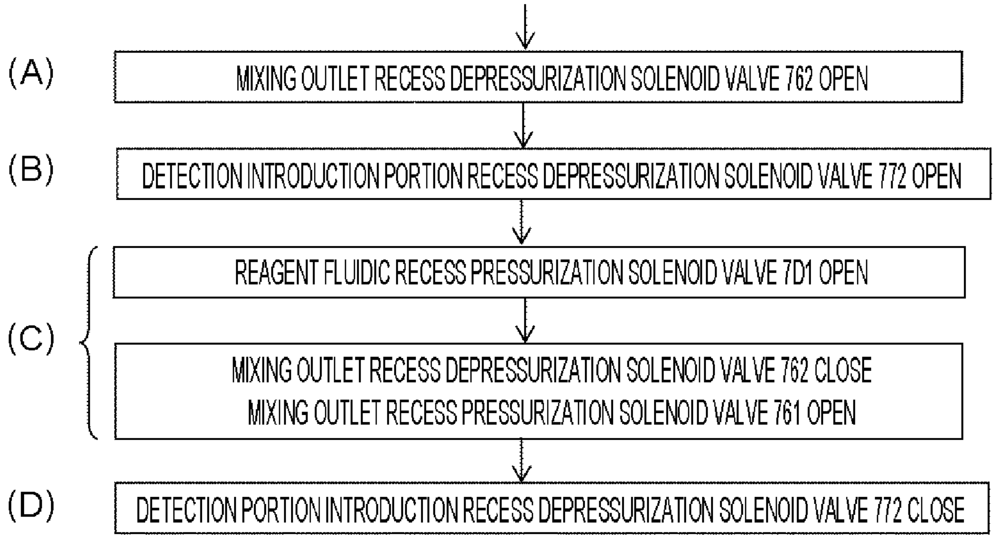
FIG. 21 is a diagram showing a measurement operation flow of the sample processing apparatus according to the first embodiment.

Next, measurement 315 of FIG. 9 will be described with reference to FIG. 21, FIG. 6, and FIG. 7. FIG. 21 is a diagram showing a measurement operation flow by controlling opening and closing of the pressurization solenoid valves and the depressurization solenoid valves of the sample processing apparatus in the present embodiment.

In (A) of FIG. 21, by opening the mixing outlet recess depressurization solenoid valve 762, the mixing sealing recess 46 is depressurized, and mixed liquids held in the mixing well 12 after the completion of mixing are sucked from the mixing sealing upstream groove 126. In this situation, the air flows into the mixing well 12 through the central circulation groove 905 and the like.

Next, in (B) of FIG. 21, by opening the detection introduction portion recess depressurization solenoid valve 772, the detection portion introduction recess 47 is depressurized, and the mixed liquids are sucked from the mixing sealing downstream groove 141. Also in this situation, the air flows into the mixing well 12 through the central circulation groove 905 and the like.

Next, in (C) of FIG. 21, by opening the reagent fluidic recess pressurization solenoid valve 7D1, the reagent fluidic recess 4D is pressurized and sealed. By closing the mixing sealing recess depressurization solenoid valve 762 and opening the mixing sealing recess pressurization solenoid valve 761, the mixing sealing recess 46 is pressurized. In this situation, the air flows out of the mixing well 12 through the central circulation groove 905 and the like.

Next, in (D) of FIG. 21, the detection portion introduction recess depressurization solenoid valve 772 is closed. In this situation, the membrane 20 of the detection portion introduction recess 47 tries to return to the lower surface side of the analysis chip 10 with an elastic force, and pushes out the mixed liquids. Since the mixing sealing recess 46 and the reagent fluidic recess 4D are sealed, the mixed liquids, while filling the detection portion introduction downstream groove 142, the detection groove 143, and the disposal upstream groove 144, move to the disposal downstream groove 145, which a gap between the analysis chip 10 and the membrane 20 of the disposal recess 48, which is not pressurized, and excessive mixed liquids are pushed out to the disposal well 13. In this situation, the air flows out of the disposal well 13 through the central circulation groove 905 and the like.

In this state, the detection groove 143 is irradiated with observation light from the observation window 52 of FIG. 5 to acquire data. Heretofore, the operation of the measurement 315 in FIG. 9 has been described, and the analysis operation 307 in FIG. 8 is completed here.

It is to be noted that the detection groove 143 has a function of holding the liquid in a sealed space, and in the first embodiment that has been described above in detail, an analysis operation of irradiating the detection groove 143 with observation light from the observation window 52 to acquire data has been described. However, the processes in the processing grooves in the present embodiment are not limited to the analysis or detection. For example, after mixing the two liquids with the mixing 314 of FIG. 9, the two liquids may be reacted by being held in the detection groove 143 and then may be recovered from the disposal well 13. Alternatively, the liquids may be held in the detection groove 143 to perform a process other than optical measurements, such as temperature control.

Second Embodiment

In the sample processing device in the first embodiment that has been described above, the reagent storage configured by using the upper surface member and the lower surface member is joined to the sealing film of the analysis chip. However, in a sample processing device in a second embodiment, the reagent storage is formed by directly joining the upper member of the reagent storage to the sealing film of the analysis chip, or by serving the upper member of the reagent storage also as the sealing film of the analysis chip. In other words, the sealing film is configured to also serve as the lower surface member or the role of the lower surface member.

That is, the second embodiment is an embodiment of a sample processing device configured by including a reagent storage, a processing unit including an upper surface fluid channel through which a liquid flows on an upper surface side, and a lower surface fluid channel through which the liquid flows on a lower surface side, both ends of the upper surface fluid channel communicating with the lower surface fluid channels that are different, and an elastic film which seals the lower surface side of the processing unit. The reagent storage includes a storage space which stores a reagent between an upper member and the upper surface side of the processing unit, and a joint portion which joins the upper member and the upper surface side of the processing unit at a periphery of the storage space and a periphery of the upper surface fluid channel, and the joint portion includes a low-strength joint portion in which at least a part between the upper surface fluid channel and the storage space is weaker in joint strength than other parts.

Figure 22:
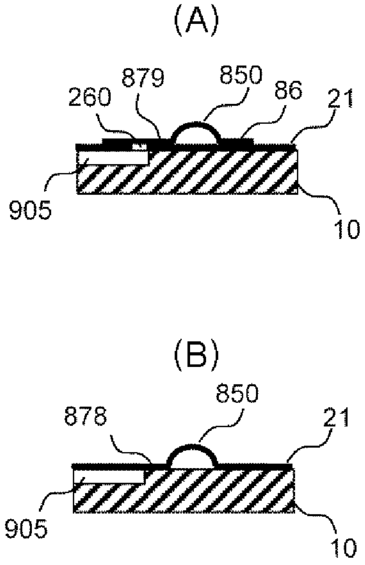
FIG. 22 is a side cross-sectional view of a reagent storage according to a second embodiment.

FIG. 22 shows a configuration of a reagent introduction portion of an analysis chip, which is a substantial part of the sample processing device in the present embodiment. In (A) of FIG. 22, the reagent chamber 850 is provided by directly joining the upper member 86 of the reagent storage 85 to the sealing film 21 of the analysis chip 10. That is, the sealing film of the analysis chip also serves as the role of the lower member of the reagent storage. In addition, a low-strength joint portion 879 is provided between the reagent chamber 850 and a removed portion 260 of the sealing film 21.

Alternatively, as shown in (B) of FIG. 22, the reagent chamber 850 may be provided between the sealing film 21 of the analysis chip 10 and the analysis chip 10. That is, the sealing film of the analysis chip also serves as the role of the upper member of the reagent storage. In addition, a low-strength joint portion 878 is provided between the circulation groove 905, which is an upper surface fluid channel provided between the sealing film 21 and the analysis chip 10, and the reagent chamber 850. That is, the reagent storage is configured with the reagent chamber 850, which is a storage space that stores a reagent between the upper member that is the sealing film 21 and the upper surface side of the analysis chip 10, which is the processing unit, and the joint portion that joins the upper member and the upper surface side of the analysis chip at a periphery of the reagent chamber 850 and a periphery of the circulation groove 905, which is the upper fluid channel. The joint portion includes the low-strength joint portion 878, in which at least a part between the upper surface fluid channel and the storage space is lower in joint strength than other parts.

Also in the sample processing device and the sample processing apparatus in the second embodiment that have been described above, in a sealed device including a combination of a reagent storage and the processing unit, in which the liquid and the air to be processed internally are not in contact with the outside, a fluidic manipulation is enabled by deformation of the elastic film, and the reagent can be introduced into the device with a small amount of residual liquid.

Third Embodiment

Figure 23:
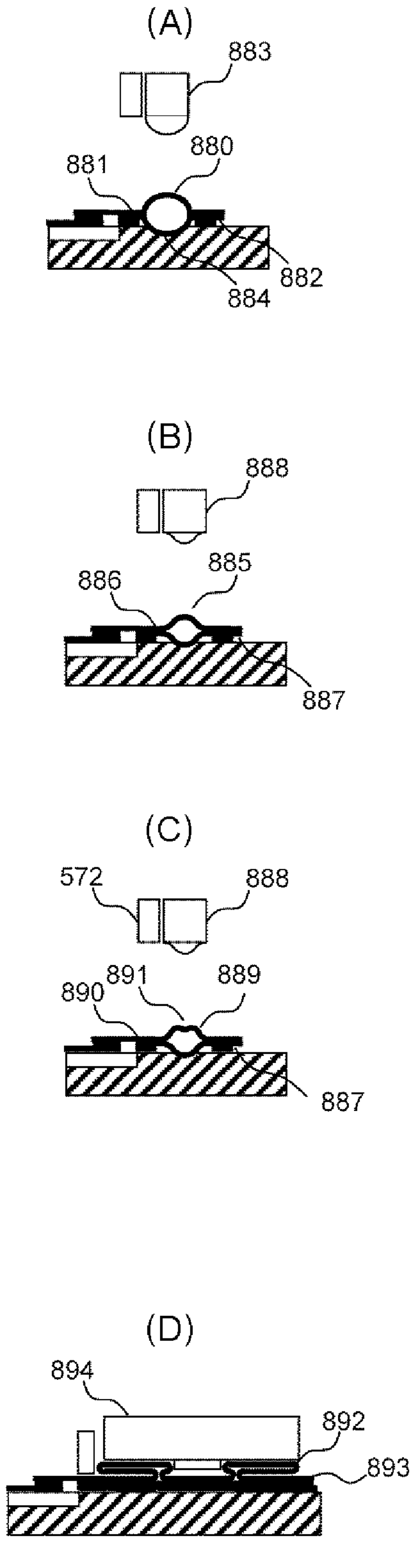
FIG. 23 is a diagram showing a configuration example of a reagent storage and a reagent extruding mechanism of the sample processing apparatus according to a third embodiment.

A third embodiment is an embodiment of a configuration of a reagent storage in a sample processing device and a sample processing apparatus and a reagent extruding mechanism. FIG. 23 shows an example of the reagent storage and the reagent extruding mechanism in the third embodiment.

In (A) of FIG. 23, an upper member 881 and a lower member 882 both constituting a reagent chamber 880 of the reagent storage have substantially inverted shapes from each other in which the upper member 881 has a convex shape on the upper surface side and the lower member 882 has a convex shape on the lower surface side. In addition, the tip of an extruding mechanism 883 also has a convex shape, and the upper surface side of the analysis chip 10 has a concave shape 884 to correspond to the convex shape of the lower member 882. In such a state, when the extruding mechanism 883 is descended to crush the reagent chamber 880, the upper member 881 is inverted and adheres to the lower member 882, and the reagent flows out without residual liquid.

In (B) of FIG. 23, an upper member 886 or a lower member 887 both constituting a reagent chamber 885 do not have a simple convex shape, but are formed of smooth surfaces from the convex portions of both members to the joint surfaces. The tip of an extruding mechanism 888 has a similar aspect, and when crushed, the upper member 886 is smoothly inverted and adheres to the lower member 887, and the reagent flows out without residual liquid.

In (C) of FIG. 23, a part of a convex portion of an upper member 890 constituting a reagent chamber 889 is depressed to form a depressed portion 891. Accordingly, when crushed by the extruding mechanism 888, the upper member 890 is inverted and adheres to the lower member 887, which is triggered by the depressed portion 891, and the reagent flows out without residual liquid. Such a depressed portion 891 creates a trigger of deformation when crushed, and has an effect of preventing biased deformation. As long as the same effect can be obtained, a part may be made flat or the curvature may be changed, in addition to the depressed shape.

(D) of FIG. 23 shows a state in which the reagent chamber 892 is crushed without a gap. An upper member 893 having such a shape is manufactured. In holding the reagent, the space of the upper member is expanded to store the reagent and is joined to the lower member. When an extruding mechanism 894 crushes the reagent chamber 892, no gap is created by crushing. Therefore, the reagent flows out without residual liquid.

According to the third embodiment, the fluidic manipulation can be performed by deformation of an elastic film in the sample processing device and a device in a sealed state of the sample processing apparatus in the first embodiment, and a reagent can be introduced into the device with a smaller amount of residual liquid.

Fourth Embodiment

A fourth embodiment is an embodiment of a configuration capable of protecting a reagent chamber of a contact-type device.

Figure 24:
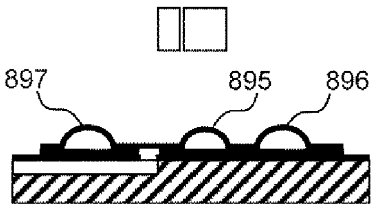
FIG. 24 is a side cross-sectional view of a reagent storage according to a fourth embodiment.

As shown in FIG. 24, air chambers 896 and 897 are provided on both sides of a reagent chamber 895. In FIG. 24, the two air chambers 896 and 897 are larger than the reagent chamber 895. By providing a protective structure including the air chambers to surround the reagent chamber in this manner, even in a case where a contact-type device mounting a reagent is dropped, the air chambers 896 and 897 protect the reagent chamber. Therefore, the reagent does not flow out of the reagent chamber 895. Since such a protective structure has a purpose of protecting the reagent chamber, the shapes of the air chambers 896 and 897 may not necessarily be hemispherical, and may be ribs or protrusions. The inside may include any other material than the air, or may have no space in the inside.

According to the present embodiment, similarly to the sample processing devices and sample processing apparatuses in the first to third embodiments, a reagent can be introduced into a device with a small amount of residual liquid by the fluidic manipulation by deformation of an elastic film. Further, a reagent chamber can be protected.

The above embodiments have been described in detail for a better understanding of the invention, and are not necessarily limited to those having all the configurations in the description. Further, with respect to a part of the configuration in an embodiment, it is possible to add, delete, replace with another configuration. For example, the sealed device in which a liquid and the air are processed has been described, but a device that processes a gas other than the liquid and the air may be applicable.

According to the invention, by deforming the membrane 20 pneumatically, the air is made to circulate through the circulation groove, in performing a manipulation such as liquid feeding, quantification, and mixing. Therefore, a change in the air pressure in a well is alleviated and a stable fluidic manipulation is enabled.

In addition, since both ends of the circulation groove on the upper surface side of the analysis chip communicate with the respective grooves on the lower surface side and there is no dead end. Therefore, by directly introducing the reagent into the circulation groove on the upper surface side, the entire amount can be sucked into the grooves on the lower surface side. In particular, by arranging the film removed portion of the reagent storage on an upper part of the circulation groove or the like on the upper surface side of the analysis chip, there is no dead space between the reagent storage and the circulation groove, and a slight amount of the reagent can be introduced and fluidized into the analysis chip with a small amount of residual liquid.

Heretofore, the matters in the description that have been described in detail disclose not only the inventions according to the claims but also various inventions. Some of them are listed below.

<List 1>

A sample processing device characterized by including:

a processing unit including a lower surface fluid channel through which a liquid flows on a lower surface side, and an upper surface fluid channel through which the liquid flows on an upper surface side;

a reagent storage including a storage space which stores a reagent between the upper member and the upper surface side of the processing unit, and a joint portion which joins the upper member and the upper surface side of the processing unit at a periphery of the storage space and a periphery of the upper surface fluid channel; and an elastic film which seals the lower surface side of the processing unit, wherein in the joint portion, at least a part between the upper surface fluid channel and the storage space is weaker in joint strength than other parts, and both ends of the upper surface fluid channel communicate with the lower surface fluid channels that are different.

<List 2>

A sample processing device characterized by including:

a reagent storage including an upper member, a lower member, a storage space which stores a reagent between both members, and a joint portion which joins the both members at a periphery of the storage space;

a processing unit including a lower surface fluid channel through which a liquid flows on a lower surface side, and an upper surface fluid channel through which the liquid flows on an upper surface side; and an elastic film which seals the lower surface side of the processing unit, wherein at least a part of the lower member of the reagent storage is joined to the upper surface side of the processing unit, the lower member includes a removed portion, from which a part of the lower member has been removed, in an upper part of the upper surface fluid channel, in the joint portion, at least a part between the removed portion and the storage space is weaker in joint strength than other parts, and both ends of the upper surface fluid channel communicate with the lower surface fluid channels that are different.

<List 3>

A sample processing device characterized by including:

a reagent storage including an upper member, a lower member, a storage space which stores a reagent between both members, and a joint portion which joins the both members at a periphery of the storage space;

a processing unit including a lower surface fluid channel through which a liquid flows on a lower surface side, and an upper surface fluid channel through which the liquid flows on an upper surface side;

a sealing member which seals the upper surface side of the processing unit; and an elastic film which seals the lower surface side of the processing unit, wherein at least a part of the lower member of the reagent storage is joined to the sealing member, the lower member and the sealing member each include a removed portion, from which a part of the lower member has been removed, in an upper part of the upper surface fluid channel, in the joint portion, at least a part between the removed portion and the storage space is weaker in joint strength than other parts, and both ends of the upper surface fluid channel communicate with the lower surface fluid channels that are different.

<List 4>

A sample processing device characterized by including:

a reagent storage;

a processing unit including an upper surface fluid channel through which a liquid flows on an upper surface side, and a lower surface fluid channel through which the liquid flows on a lower surface side, both ends of the upper surface fluid channel communicating with the lower surface fluid channels that are different;

a sealing member which seals the upper surface side of the processing unit; and an elastic film which seals the lower surface side of the processing unit, wherein a reagent storage includes an upper member, a lower member, a storage space which stores a reagent between both members, and a joint portion which joins the both members at a periphery of the storage space, at least a part of the lower member is joined to the sealing member, and the lower member and the sealing member each include a removed portion, from which a part of the lower member has been removed, in an upper part of the upper surface fluid channel, and in the joint portion, at least a part between the removed portion and the storage space is weaker in joint strength than other parts.

<List 5>

A sample processing apparatus characterized by including:

a processing unit including a lower surface fluid channel through which a liquid flows on a lower surface side, and an upper surface fluid channel through which the liquid flows on an upper surface side;

a reagent storage including a storage space which stores a reagent between the upper member and the upper surface side of the processing unit, and a joint portion which joins the upper member and the upper surface side of the processing unit at a periphery of the storage space and a periphery of the upper surface fluid channel;

a driving unit which controls air;

an elastic film arranged between the processing unit and the driving unit; and a pneumatic controller which switches between whether the elastic film is adhered to the processing unit or the driving unit, wherein in the joint portion, at least a part between the upper surface fluid channel and the storage space is weaker in joint strength than other parts, and both ends of the upper surface fluid channel communicate with the lower surface fluid channels that are different.

<List 6>

A sample processing apparatus characterized by including:

a reagent storage including an upper member, a lower member, a storage space which stores a reagent between both members, and a joint portion which joins the both members at a periphery of the storage space;

a processing unit including a lower surface fluid channel through which a liquid flows on a lower surface side, and an upper surface fluid channel through which the liquid flows on an upper surface side;

a driving unit which controls air;

an elastic film arranged between the processing unit and the driving unit; and a pneumatic controller which switches between whether the elastic film is adhered to the processing unit or the driving unit, wherein at least a part of the lower member of the reagent storage is joined to the upper surface side of the sealing member, the lower member includes a removed portion, from which a part of the lower member has been removed, in an upper part of the upper surface fluid channel, in the joint portion, at least a part between the removed portion and the storage space is weaker in joint strength than other parts, and both ends of the upper surface fluid channel communicate with the lower surface fluid channels that are different.

<List 7>

A sample processing apparatus characterized by including:

a reagent storage including an upper member, a lower member, a storage space which stores a reagent between both members, and a joint portion which joins the both members at a periphery of the storage space;

a processing unit including a lower surface fluid channel through which a liquid flows on a lower surface side, and an upper surface fluid channel through which the liquid flows on an upper surface side;

a sealing member which seals the upper surface side of the processing unit;

a driving unit that controls air;

an elastic film arranged between the processing unit and the driving unit; and a pneumatic controller which switches between whether the elastic film is adhered to the processing unit or the driving unit, wherein at least a part of the lower member of the reagent storage is joined to the sealing member, the lower member and the sealing member each include a removed portion, from which a part of the lower member has been removed, in an upper part of the upper surface fluid channel, in the joint portion, at least a part between the removed portion and the storage space is weaker in joint strength than other parts, and both ends of the upper surface fluid channel communicate with the lower surface fluid channels that are different.

<List 8>

A sample processing apparatus characterized by including:

a reagent storage;

a processing unit including an upper surface fluid channel through which a liquid flows on an upper surface side, and a lower surface fluid channel through which the liquid flows on a lower surface side, both ends of the upper surface fluid channel communicating with the lower surface fluid channels that are different;

a sealing member which seals the upper surface side of the processing unit;

a driving unit that controls air;

an elastic film arranged between the processing unit and the driving unit; and a pneumatic controller which switches between whether the elastic film is adhered to the processing unit or the driving unit, wherein the reagent storage includes an upper member, a lower member, a storage space which stores a reagent between both members, and a joint portion which joins the both members at a periphery of the storage space, at least a part of the lower member is joined to the sealing member, and the lower member and the sealing member each include a removed portion, from which a part of the lower member has been removed, in an upper part of the upper surface fluid channel, and in the joint portion, at least a part between the removed portion and the storage space is weaker in joint strength than other parts.

REFERENCE SIGNS LIST

1 sample processing device
10 analysis chip
11 sample well
12 mixing well
13 disposal well
111, 112, 113, 114, 115, 116, 121, 122, 123, 124, 125, 126, 131, 132, 133, 134, 141, 142, 144, 145 groove
143 detection groove
20 membrane
21 sealing film
221 third reagent through hole
23 feeder film
260 fourth reagent through hole
280 feeder hole
40 driving unit
41, 42, 43, 44, 45, 46, 47, 48, 49, 4A, 4B, 4C, 4D, 4E recess
411, 421, 431, 441, 451, 461, 471, 481, 491, 4A1, 4B1, 4C1, 4D1, 4E1 pressurization tube
412, 422, 432, 442, 452, 462, 472, 482, 492, 4A2, 4B2, 4C2, 4D2, 4E2 depressurization tube
50 lid
51 rotation support
52 observation window
53 housing
54 lock mechanism
55 multi-liquid extruding mechanism
551 first reagent low-strength joint portion pressurization mechanism
552 first reagent chamber pressurization mechanism
553 first-second reagent low-strength joint portion pressurization machine
554 second reagent chamber pressurization mechanism
555 second-third reagent low-strength joint portion pressurization machine
556 third reagent chamber pressurization mechanism
557 third reagent low-strength joint portion pressurization mechanism
57 single-liquid extruding mechanism
571 fourth reagent chamber pressurization mechanism
572 fourth reagent low-strength joint portion pressurization mechanism
60 pneumatic controller
61 manipulation unit
70 air piping
71 pressurization pump
711, 721, 731, 741, 751, 761, 771, 781, 791, 7A1, 7B1, 7C1, 7D1, 7E1 pressurization solenoid valve
72 depressurization pump
712, 722, 732, 742, 752, 762, 772, 782, 792, 7A2, 7B2, 7C2, 7D2, 7E2 depressurization solenoid valve
80 multi-liquid reagent storage
81 multi-liquid upper film
810 first reagent chamber
811 second reagent chamber
812 third reagent chamber
82 multi-liquid lower film
821 third reagent film removed portion
831 first-second reagent low-strength joint portion
832 second-third reagent low-strength joint portion
833 third reagent low-strength joint portion
85 single-liquid reagent storage
850 fourth reagent chamber
86 single-liquid upper film
860 fourth reagent film removed portion
87 single-liquid lower film
870 fourth reagent low-strength joint portion
875 non-joint region
878, 879 low-strength joint portion
880, 885, 889, 892, 895 reagent chamber
881, 886, 893 upper member
882, 887 lower member
883, 888, 894 extruding mechanism
896, 897 air chamber
901, 902, 903, 904, 905, 906, 907, 908 circulation groove
911 third reagent vertical hole
912 fourth reagent vertical hole
915, 916 air reservoir

The invention claimed is:

1. A sample processing apparatus comprising:

a reagent storage;

a processing unit including:

an upper surface side, an upper surface fluid channel through which a liquid flows on the upper surface side and the upper surface fluid channel includes a plurality of wells on the upper surface side, a lower surface side, a plurality of lower surface fluid channels through which the liquid flows on the lower surface side, and wherein the plurality of wells of the upper surface fluid channel fluidically communicate with different lower surface fluid channels of the plurality of lower surface fluid channels;

a sealing film that directly connects the upper surface side of the processing unit to the reagent storage;

a driving unit which controls air and includes a plurality of recesses, a plurality of pressurization tubes, and a plurality of depressurization tubes, and each of the plurality of pressurization tubes and each of the plurality of depressurization tubes are connected to one of the plurality of recesses in the driving unit;

an elastic film seals the lower surface side of the processing unit and is arranged between the lower surface side and the driving unit; and a pneumatic controller, including a first pump, a plurality of pressurization solenoid valves, a second pump, and a plurality of depressurization solenoid valves, which pneumatically controls air pressure in the driving unit based on a signal, by opening or closing at least one of the plurality of pressurization solenoid valves or the plurality of depressurization solenoid valves, wherein the first pump is connected to the plurality of pressurization solenoid valves, and each of the plurality of pressurization solenoid valves are connected on an opposite end to one of the plurality of pressurization tubes in the driving unit, the second pump is connected to the plurality of depressurization solenoid valves, and each of the plurality of depressurization solenoid valves are connected on an opposite end to one of the plurality of depressurization tubes in the driving unit, on a condition that the plurality of pressurization solenoid valves are opened, air flows from the first pump through the plurality of pressurization tubes into the plurality of recesses and pressurizes the plurality of recesses causing the elastic film to adhere to the processing unit, or on a condition that the plurality of depressurization solenoid valves are opened, air flows from the plurality of recesses through the plurality of depressurization tubes into the second pump and depressurizes the plurality of recesses causing the elastic film to adhere to the driving unit, the reagent storage includes an upper member, a lower member, a storage space which stores a reagent between the upper member and the lower member, and a joint portion which joins the upper member and the lower member at a periphery of the storage space, at least a part of the lower member is joined to the upper surface side of the processing unit, the lower member includes a removed portion, which is a hole in the lower member, and the removed portion is aligned with an upper part of the upper surface fluid channel, and the joint portion includes a low-strength joint portion in which at least a part between the removed portion and the storage space is weaker in joint strength than other parts.

2. The sample processing apparatus according to claim 1, wherein the reagent storage, the processing unit, and the elastic film constitute a sealed device.

3. The sample processing apparatus according to claim 2, further comprising a housing and a lid, wherein the sealed device is mounted on the driving unit with the elastic film facing the driving unit, and the sealed device is enclosed by the housing and the lid, and the lid includes two sections mounted on a top side of the lid, outside of the housing, each of the two sections include multiple moveable portions, and one of the two sections is above the storage space and an other of the two sections is above the low-strength joint portion, and the pneumatic controller controls, based on the signal, movement of each of the multiple moveable portions, such that each of the multiple moveable portions moves in a vertical direction toward the housing and presses on one of the storage space or the low-strength joint portion.

4. The sample processing apparatus according to claim 3, further comprising a controller, wherein the controller sends the signal, and the storage space and the low-strength joint portion are pressurized by controlling, via the pneumatic controller, the movement of the multiple moveable portions to introduce a reagent from the reagent storage into the upper surface fluid channel.

5. The sample processing apparatus according to claim 4, wherein the upper member forming the storage space has a convex shape on an upper surface side, and the lower member has a convex shape on a lower surface side, and the multiple moveable portions have a convex shape with a tip on the lower surface side.

* * * * *